(12) United States Patent
Bok

(10) Patent No.: US 7,686,044 B2
(45) Date of Patent: Mar. 30, 2010

(54) SYSTEM AND METHOD FOR DISPENSING LIQUID CRYSTAL MATERIAL AND METHOD FOR FABRICATING LIQUID CRYSTAL DISPLAY DEVICE USING THE SAME

(75) Inventor: Gu-Yun Bok, Seoul (KR)

(73) Assignee: LG Display Co., Ltd, Seoul (KR)

( * ) Notice: Subject to any disclaimer, the term of this patent is extended or adjusted under 35 U.S.C. 154(b) by 1108 days.

(21) Appl. No.: 11/318,629

(22) Filed: Dec. 28, 2005

(65) Prior Publication Data

US 2006/0283520 A1    Dec. 21, 2006

(30) Foreign Application Priority Data

Jun. 20, 2005    (KR) .................. 10-2005-0053202

(51) Int. Cl.
*B65B 1/30*    (2006.01)

(52) U.S. Cl. .................................... 141/192; 141/83

(58) Field of Classification Search ............ 141/1, 141/83, 94, 192, 198
See application file for complete search history.

(56) References Cited

U.S. PATENT DOCUMENTS

| 6,863,097 | B2 * | 3/2005 | Ryu et al. | 141/95 |
| 6,997,216 | B2 * | 2/2006 | Ryu et al. | 141/67 |
| 7,021,342 | B2 * | 4/2006 | Ryu et al. | 141/95 |
| 7,322,490 | B2 * | 1/2008 | Ryu et al. | 222/1 |

* cited by examiner

*Primary Examiner*—Gregory L Huson
*Assistant Examiner*—Jason K Niesz
(74) *Attorney, Agent, or Firm*—McKenna Long & Aldridge LLP

(57) ABSTRACT

A liquid crystal dispensing system in which dispensing of a liquid crystal material is paused when an earthquake or the like occurs, while restarting the dispensing of the liquid crystal material when the earthquake stops, the liquid crystal dispensing system comprising a liquid crystal dispensing apparatus for dispensing a liquid crystal material onto a substrate, a detecting unit for detecting an abnormal dispensing, and a controller for controlling the liquid crystal dispensing apparatus to pause dispensing of the liquid crystal material when an abnormal dispensing of liquid crystal material is detected.

33 Claims, 17 Drawing Sheets

SYSTEM AND METHOD FOR DISPENSING LIQUID CRYSTAL MATERIAL AND METHOD FOR FABRICATING LIQUID CRYSTAL DISPLAY DEVICE USING THE SAME

This application claims the benefit of Korean Patent Application No. 2005-53202, filed on Jun. 20, 2005, which is hereby incorporated by reference for all purposes as if fully set forth herein.

BACKGROUND OF THE INVENTION

1. Field of the Invention

The present invention relates to a liquid crystal dispensing system and a method for manufacturing a liquid crystal display device using the same, and particularly, to a liquid crystal dispensing system capable of preventing or minimizing a fabrication of a defective liquid crystal panel caused by an external impact.

2. Discussion of the Related Art

As various portable electric devices such as mobile phones, personal digital assistants (PDA), notebook computers, etc., continue to be developed, various types of flat panel display devices such as liquid crystal displays (LCDs), plasma display panels (PDPs), field emission displays (FEDs), and vacuum florescent displays (VFDs), which have such advantages as compact construction, light weight and low power-consumption, also continue to be developed. Owing to their simple driving scheme and superior ability to display images, LCDs are widely used in many electric devices.

An LCD device is a device that displays information on a screen by using the refractive anisotropy characteristics of liquid crystal. FIG. 1 is a cross-sectional view illustrating an LCD device according to the related art.

Referring to FIG. 1, the LCD device 1 includes a lower substrate 5, a upper substrate 3 and a liquid crystal layer 7 formed therebetween. The lower substrate 5 (i.e., a driving device array substrate) includes a plurality of pixels (not shown), with a driving device (e.g., a thin film transistor (TFT)) and a pixel electrode formed at each pixel. The upper substrate 3 (i.e., a color filter substrate) includes a color filter layer for reproducing color images and a common electrode. Alignment layers are formed on both the lower and upper substrates 5 and 3 to align the liquid crystal molecules of the liquid crystal layer 7.

The lower substrate 5 and the upper substrate 3 are attached to each other by a sealant material 9 formed at peripheral regions thereof, and the liquid crystal layer 7 is confined within an area defined by the seal material 9. The light transmittance characteristics of the pixels are controlled by electric fields between the pixel electrodes and the common electrode. The electric fields reorient the liquid crystal molecules of the liquid crystal layer 7 to display a picture.

FIG. 2 is a flow chart illustrating a method for fabricating the related art LCD device illustrated in FIG. 1.

Referring to FIG. 2, a method for fabricating the related art LCD device includes three sub-processes: a TFT array substrate forming process; a color filter substrate forming process; and a cell forming process.

In step S101, A plurality of gate lines and data lines are formed on the lower substrate 5 (e.g., a glass substrate) to define an array of pixel areas according to the TFT array substrate forming process. TFTs are connected to the gate lines and the data lines within each pixel area, and pixel electrodes are connected to the thin film transistors to drive a subsequently provided liquid crystal layer in accordance with signals applied through the thin film transistors.

In step S104, R, G and B color filter layers for displaying color images and a common electrode are formed on the upper substrate 3 (i.e., a glass substrate) according to the color filter process.

In steps of S102 and S105, alignment layers are formed on the surfaces of both the lower substrate 5 and upper substrate 3. Subsequently, the alignment layers are rubbed to induce surface anchoring (i.e., a pretilt angle and alignment direction) within the liquid crystal molecules of the liquid crystal layer 7.

In step S103, spacers are dispersed onto the lower substrate 5. In step S106, a sealant material is printed at peripheral regions of the upper substrate 3. In step S107, the lower and upper substrates 5 and 3 are pressed and bonded together (i.e., assembled) and the spacers dispersed at step S103 maintain a uniform cell gap between the assembled lower and upper substrates 5 and 3.

In step S108, the assembled upper and lower substrates 5 and 3, which are large glass substrates, are cut into unit panels. Specifically, each of the lower substrate 5 and the upper substrate 3 includes a plurality of unit panel areas and each unit panel includes individual TFT arrays and color filters.

In step S109, a liquid crystal material is injected into the cell gap of each of the unit panels through a liquid crystal injection hole defined within the sealant material. After each cell gap is completely filled with the liquid crystal material, the liquid crystal injection hole is sealed. In step S110, the filled and sealed unit panels are then tested. Here, the liquid crystal material is injected through the injection hole because of a pressure difference.

FIG. 3 illustrates a liquid crystal injection system according to the related art for fabricating an LCD device.

Referring to FIG. 3, a container 12 containing a liquid crystal material 14 is placed into a vacuum chamber 10 connected to a vacuum pump (not shown). Subsequently, a unit panel 1 formed as described above with respect to FIG. 2 is arranged over the container 12 using a unit panel handling device (not shown). Next, the vacuum pump is operated to reduce the pressure within the vacuum chamber 10 to a predetermined vacuum state. The unit panel handling device then lowers the unit panel 1 such that a liquid crystal injection hole 16 contacts a surface of the liquid crystal material 14. After the contact is established, the liquid crystal material 14 contained within the container 12 can be intaken to the cell gap of the unit panel 1 through the liquid crystal injection hole 16. The injection method described above is known as a dipping injection method.

After the contact is established, the rate at which the liquid crystal material 14 is intaken to the cell gap of the unit panel 1 can be increased by pumping nitrogen gas ($N_2$) into the vacuum chamber 10, thereby increasing the pressure within the vacuum chamber 10. As the pressure within the vacuum chamber 10 increases, a pressure difference between the cell gap of the unit panel 1 and the interior of the vacuum chamber 10 is created. Accordingly, the liquid crystal material 14 contained in the container 12 can be injected into the cell gap of the unit panel 1 at an increased injection rate. As mentioned above, once the cell gap of the unit panel 1 is completely filled with the liquid crystal material 14, the injection hole 16 is sealed by a sealant and the injected liquid crystal material 14 is sealed within the unit panel 1. The injection method described above is known as a vacuum injection method.

Despite their usefulness, there are several problems with the aforementioned dipping and vacuum injection methods.

First, it takes a relatively long time for the dipping/vacuum injection methods to completely fill the cell gap of the unit panel 1 with the liquid crystal material 14. Specifically, because the cell gap of the unit panel 1 is only a few micrometers wide, only a small amount of the liquid crystal material 14 can be injected into the unit panel 1 per unit time. For example, it can takes about 8 hours to completely inject the liquid crystal material 14 into the cell gap of a 15-inch liquid crystal display panel, which decreases the production efficiency.

Second, the aforementioned dipping/vacuum injection methods require an excessively large amount of the liquid crystal material 14. Only a small amount of the liquid crystal material 14 is actually injected into the unit panel 1. Because the liquid crystal material 14 contained in the container 12 is exposed to the atmosphere or certain other process gases during loading and unloading of the unit panel 1 in and out of the vacuum chamber 10, the liquid crystal material 14 can easily become contaminated. Therefore, the remaining liquid crystal material 14 should be discarded, which increases the production cost.

SUMMARY OF THE INVENTION

Accordingly, the present invention is directed to a liquid crystal dispensing system and a method for manufacturing a liquid crystal display device using the same that substantially obviate one or more of the problems due to limitations and disadvantages of the related art.

An advantage of the present invention is to provide a liquid crystal dispensing system and method capable of preventing or minimizing a fabrication of a defective LCD panel caused by an external impact.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal dispensing system includes a liquid crystal dispensing apparatus for dispensing a liquid crystal material onto a substrate; a detecting unit for detecting an external impact; and a controller for pausing dispensing of the liquid crystal material by controlling the liquid crystal dispensing apparatus when the abnormal dispensing is detected by the detecting unit.

The liquid crystal dispensing apparatus may include a liquid crystal material container filled with the liquid crystal material; a discharge pump which includes a cylinder, a piston inserted into the cylinder and having a groove at a lower portion, the piston being rotated and moving upwardly and downwardly for intaking and discharging the liquid crystal material, and a suction opening and a discharge opening for intaking and discharging the liquid crystal material according to the motions of the piston; and a nozzle for dispensing the liquid crystal material discharged through the discharge pump onto the substrate. The detecting unit refers to an electronic scale for measuring a dispensing amount of the liquid crystal material (i.e., an amount of the liquid crystal material to be dispensed), and inputs a signal to the controller when an impact is applied.

The controller may include an abnormal dispensing detecting unit for detecting an abnormal dispensing based on a signal inputted from the detecting unit; a dispensing amount setting unit for setting an amount of the liquid crystal material to be dispensed onto a substrate; a dispensing amount compensating unit for compensating a difference between a dispensing amount of the liquid crystal material set by the dispensing amount setting unit and an actual amount of the liquid crystal material dispensed onto the substrate; a motor driving unit for driving a motor to operate the discharge pump; and a substrate driving unit for aligning the substrate to a dispensing position of each nozzle. The abnormal dispensing detecting unit may include a signal analyzing unit for analyzing a signal inputted from the detecting unit and an abnormal state detecting unit for comparing the signal inputted from the signal analyzing unit with a set value to detect an abnormal state of the dispensing.

According to another embodiment of the present invention, a liquid crystal dispensing method includes detecting an abnormal dispensing of a liquid crystal material; aligning liquid crystal dispensing apparatuses over dispensing positions; and dispensing the liquid crystal material onto the dispensing positions.

The step of detecting the abnormal dispensing may include a signal being inputted from a weight measurement scale for measuring a dispensing amount of the liquid crystal material, and comparing the inputted signal with a set value to thus detect an abnormal dispensing of the liquid crystal material, while the step of dispensing the liquid crystal material may include measuring the dispensing amount of the liquid crystal material, compensating the dispensing amount of the liquid crystal material upon generating a deviation between the measured dispensing amount and the set dispensing amount, and dispensing the liquid crystal material onto the substrate.

It is to be understood that both the foregoing description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

A liquid crystal dispensing method has been proposed to solve the problems associated with the aforementioned dipping/vacuum injection methods. According to the liquid crystal dispensing method, a liquid crystal layer can be formed by dispensing a liquid crystal material directly onto one of the upper and lower substrates. Subsequently, the dispensed liquid crystal material is spread over the upper and lower substrates upon pressing and bonding the upper and lower substrates together (i.e., assembling the upper and lower substrates). Accordingly, a liquid crystal layer may be formed in a short time with the liquid crystal dispensing method compared to the dipping/vacuum injection methods. Further, the liquid crystal dispensing method consumes less the liquid crystal material than either the dipping or vacuum injection method.

Figure 4:
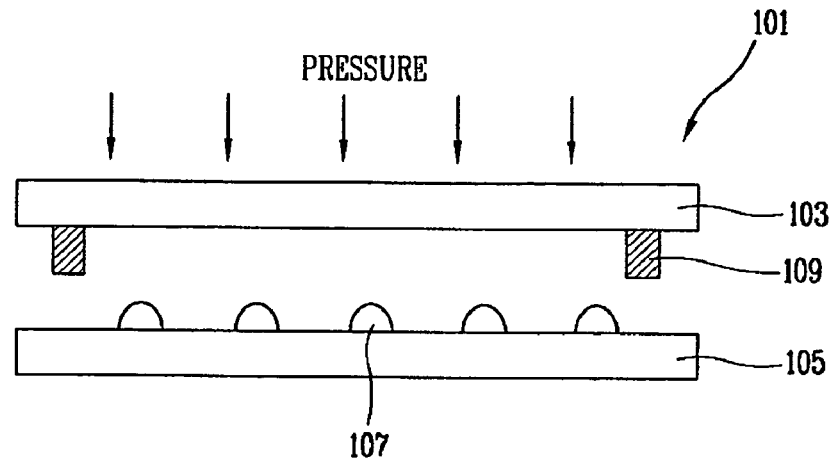
FIG. 4 illustrates a cross-sectional view of an LCD device fabricated by a liquid crystal dispensing method.

FIG. 4 illustrates a cross-sectional view of an LCD device fabricated by a liquid crystal dispensing method.

Referring to FIG. 4, a liquid crystal material 107 is dispensed in the form of droplets directly onto a lower substrate 105 prior to assembling the lower substrate 105 and a upper substrate 103. The aforementioned TFT array substrate may be the lower substrate 105 and the aforementioned color filter (CF) substrate may be the upper substrate 103. The liquid crystal material 107 is dispensed onto the upper substrate 103 in this embodiment. However, the liquid crystal material can be dispensed either on the TFT substrate or on the CF substrate according to the liquid crystal dispensing method. The substrate on which the liquid crystal material is dispensed is beneficially disposed at a lower position than the other substrate during the assembling process.

A sealant material 109 is applied to peripheral regions of the upper substrate 103. As mentioned above, the dispensed liquid crystal material 107 spreads and forms a uniform cell gap between the lower and upper substrates 105 and 103 as the substrates are pressed and bonded together to form an LCD panel 101. Specifically, in the present invention, the liquid crystal material 107 is dispensed onto the lower substrate and then the lower and upper substrates are bonded together by the sealant material 109.

Figure 5:
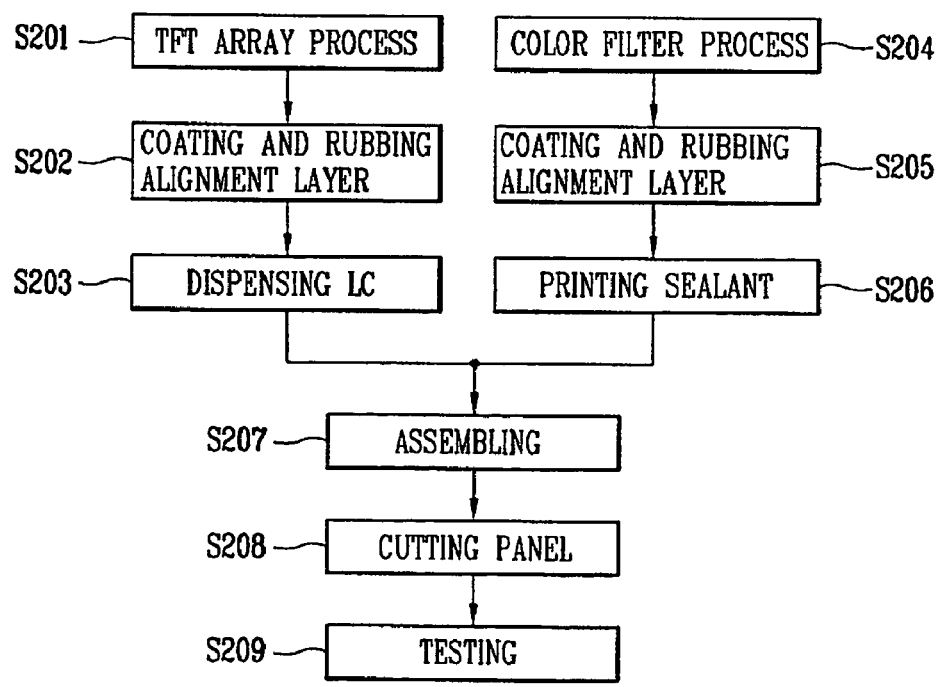
FIG. 5 is a flow chart illustrating a method for fabricating an LCD device according to a liquid crystal dispensing method.

FIG. 5 is a flow chart illustrating a method for fabricating an LCD device according to a liquid crystal dispensing method.

In steps S201 and S204, an array of driving devices, such as TFTs, is formed on the lower substrate 105 according to the TFT array substrate forming process, and a color filter is formed on the upper substrate 103 according to the color filter substrate forming process. These two processes may be performed in the same manner as described with respect to FIG. 2, and the lower and upper substrates are large glass substrates in which a plurality of panel regions are formed. For example, the sizes of the lower and upper substrates are at least about 1000×1200 mm.

In steps S202 and S205, alignment layers are formed over the surfaces of both the lower and upper substrates 105 and 103. Then, the alignment layers are rubbed or photo-aligned. In step S203, a liquid crystal material may be dispensed directly onto a unit panel area defined on the lower substrate 105. In step S206, a sealant material may be provided (e.g., printed) at peripheral regions of a unit panel area defined on the upper substrate 103.

In step S207, the upper and lower substrates 103 and 105 are aligned and subsequently pressed and bonded together (i.e., assembled). Upon assembling the upper and lower substrates 103 and 105, the dispensed liquid crystal material is evenly spread between the upper and lower substrates within a region defined by the sealant material. In step S208, the assembled upper and lower substrates are cut into a plurality of unit LCD panels which are then tested.

Figure 1:
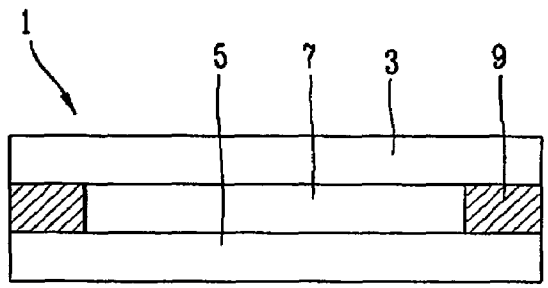
FIG. 1 is a cross-sectional view illustrating an LCD device according to the related art.
Figure 2:
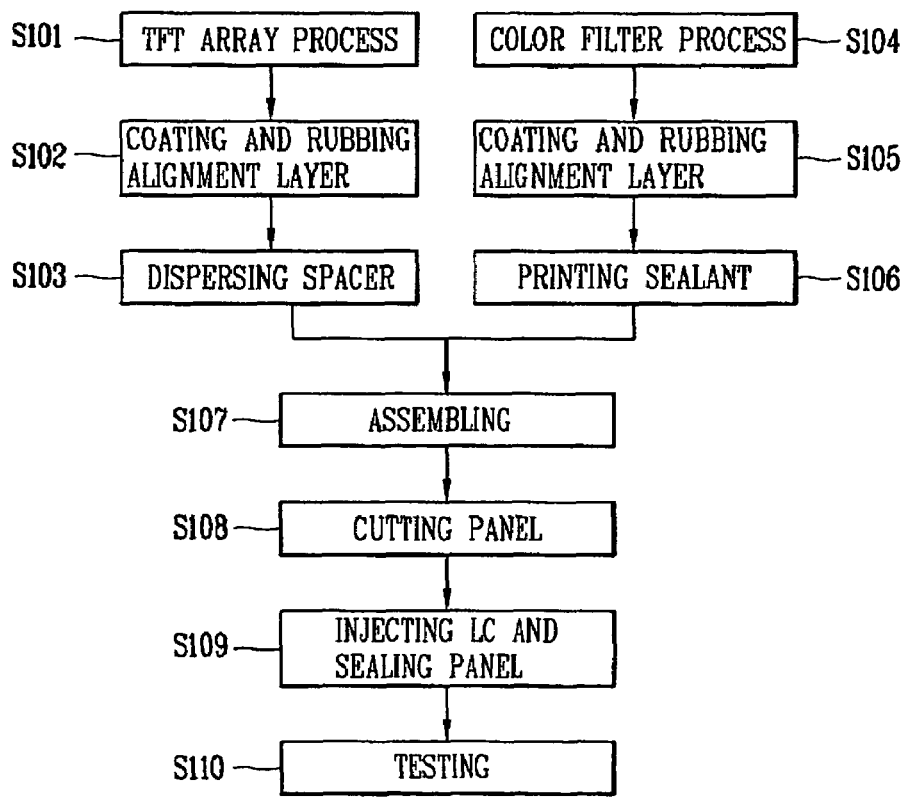
FIG. 2 is a flow chart illustrating a method for fabricating the related art LCD device illustrated in FIG. 1.
Figure 3:
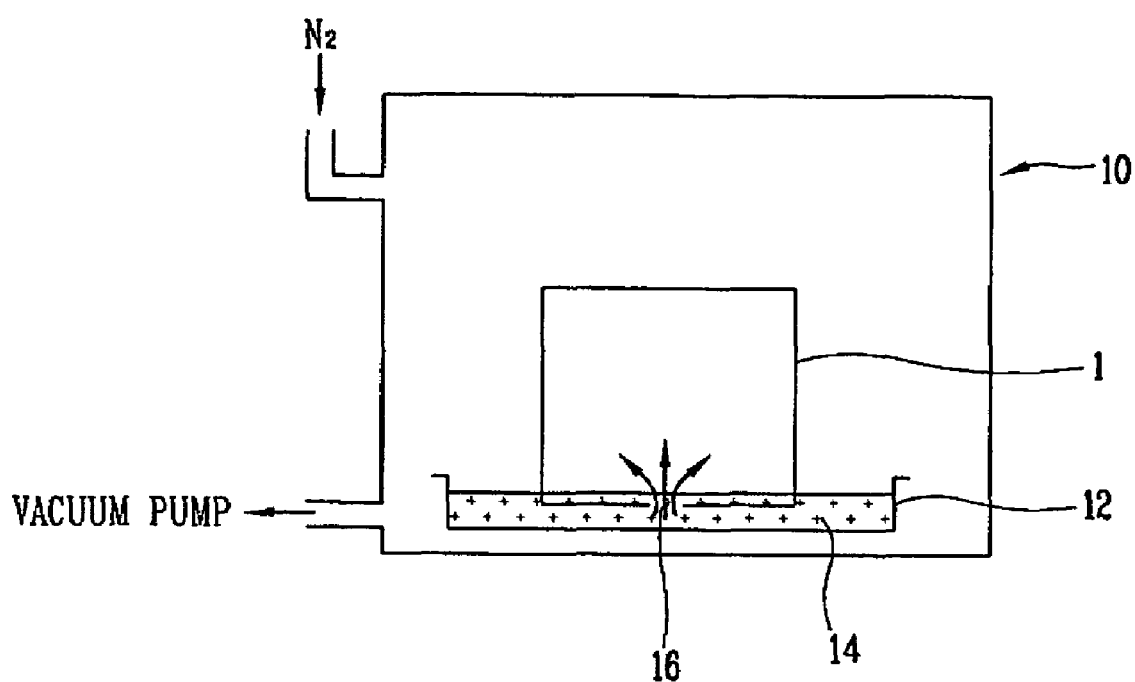
FIG. 3 illustrates a liquid crystal injection system according to the related art for fabricating an LCD device.

The liquid crystal dispensing method described above is different from the related art dipping/vacuum injection methods described with respect to FIG. 2. Specifically, the dipping/vacuum injection methods involve injecting a liquid crystal material into a predetermined cell gap through a liquid crystal injection hole defined by a sealant material and sealing the liquid crystal injection hole. Although not shown in FIG. 2, because outer surfaces of the unit panel contact the liquid crystal material contained within the container when injecting the liquid crystal material into the cell gap of the unit panel, the unit panel must be washed after the cell gap is completely filled with the liquid crystal material. The liquid crystal dispensing method illustrated in FIG. 5, however, dispenses the liquid crystal material directly onto one of the substrates, thereby eliminating the need for any liquid crystal injection hole. Moreover, because the liquid crystal material is dispensed directly onto one of the substrates, it is not required to clean the outer surfaces of the LCD panel to remove the liquid crystal material. Accordingly, the liquid crystal dispensing method for fabricating an LCD device is simpler and has a higher yield than the related art dipping/vacuum injection methods.

In the LCD device fabrication method using the liquid crystal dropping method, dispensing positions (i.e., positions on a substrate where droplets of a liquid crystal material are to be dispensed) and dispensing amounts (i.e., total amount of a liquid crystal material to be dispensed) have a heavy influence on the formation of a liquid crystal layer with a desired thickness. Because the thickness of a liquid crystal layer is closely related to the cell gap of an LCD panel, dispensing positions and amounts should be precisely controlled to prevent a fabrication of a defective LCD panel. Accordingly, the present invention provides a liquid crystal dispensing apparatus that can precisely control dispensing positions and amounts.

Figure 6:
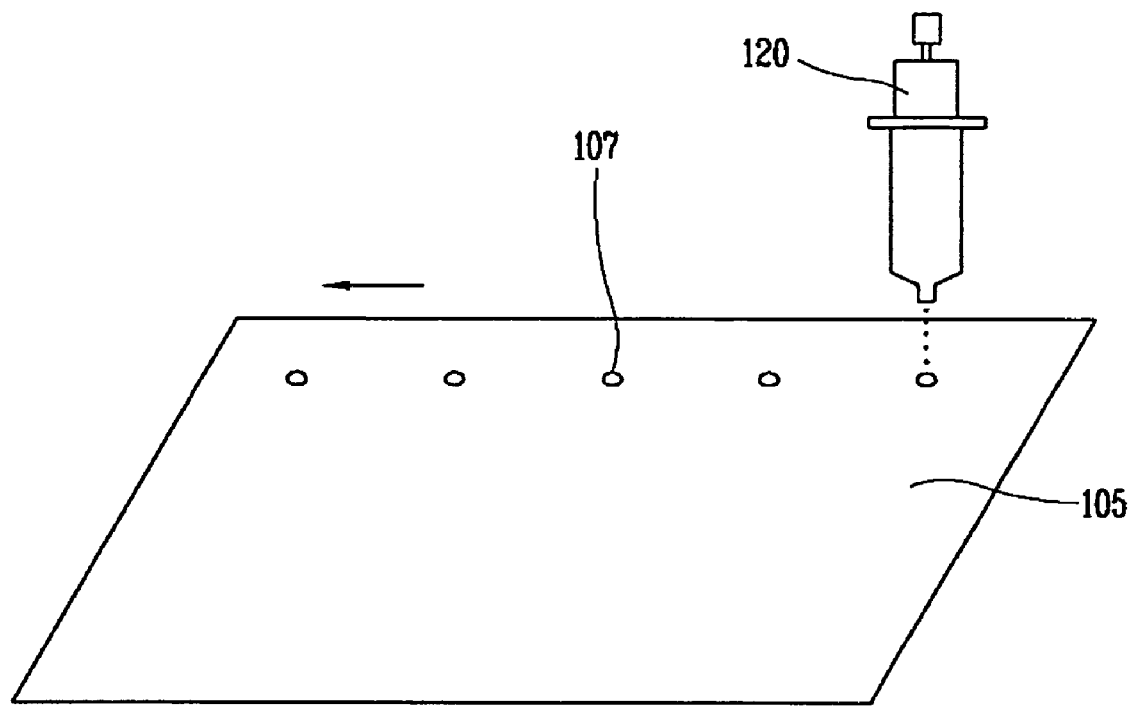
FIG. 6 illustrates a liquid crystal dispensing method according to the present invention.

FIG. 6 illustrates a liquid crystal dispensing method according to an embodiment of the present invention.

Referring to FIG. 6, a liquid crystal dispensing apparatus is arranged above the lower substrate 105 (e.g., a glass substrate) and droplets of a liquid crystal material are dispensed from the liquid crystal dispensing apparatus 120.

Figure 7:
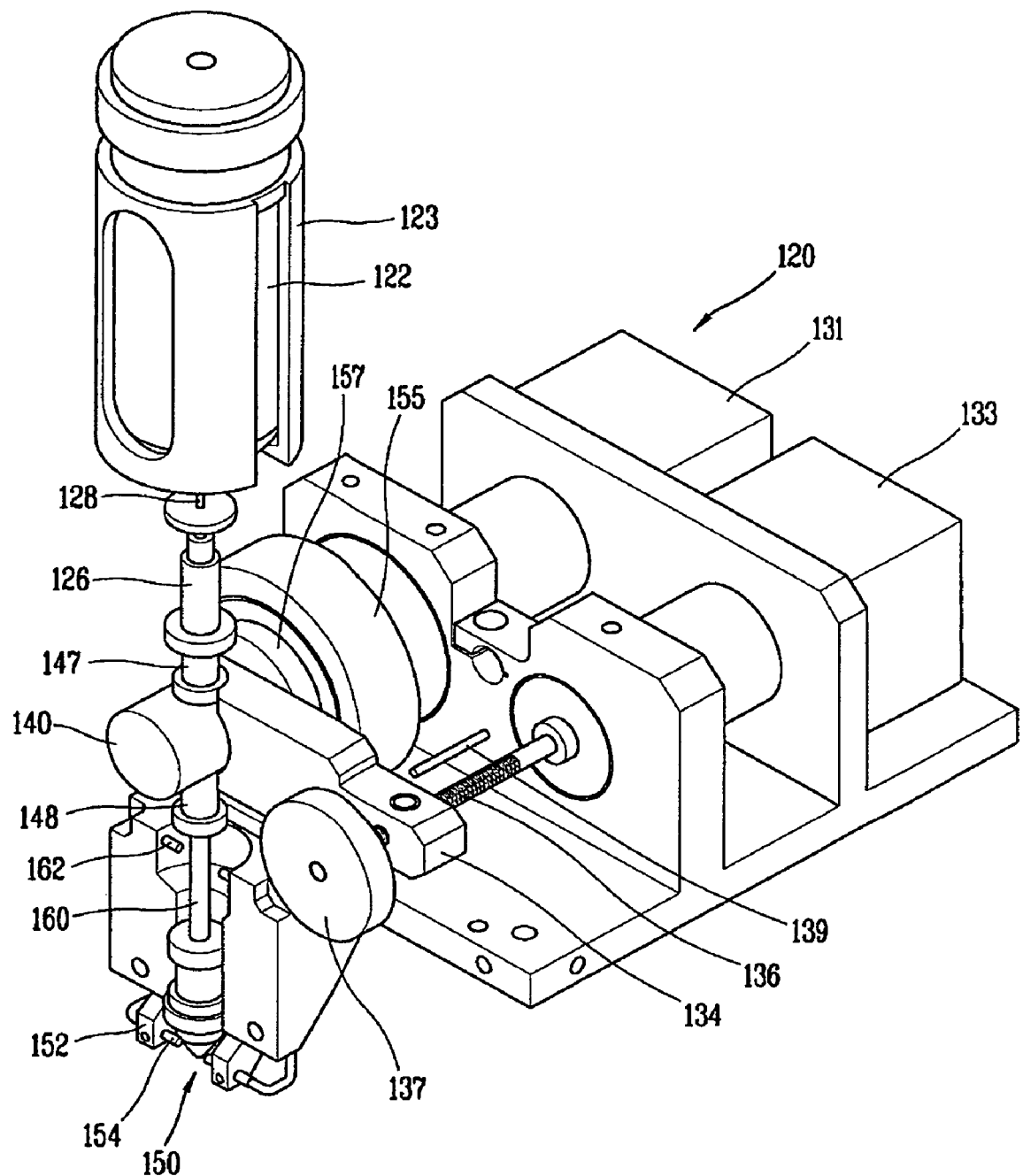
FIG. 7 is a perspective view illustrating a liquid crystal dispensing apparatus according to the present invention.
Figure 8:
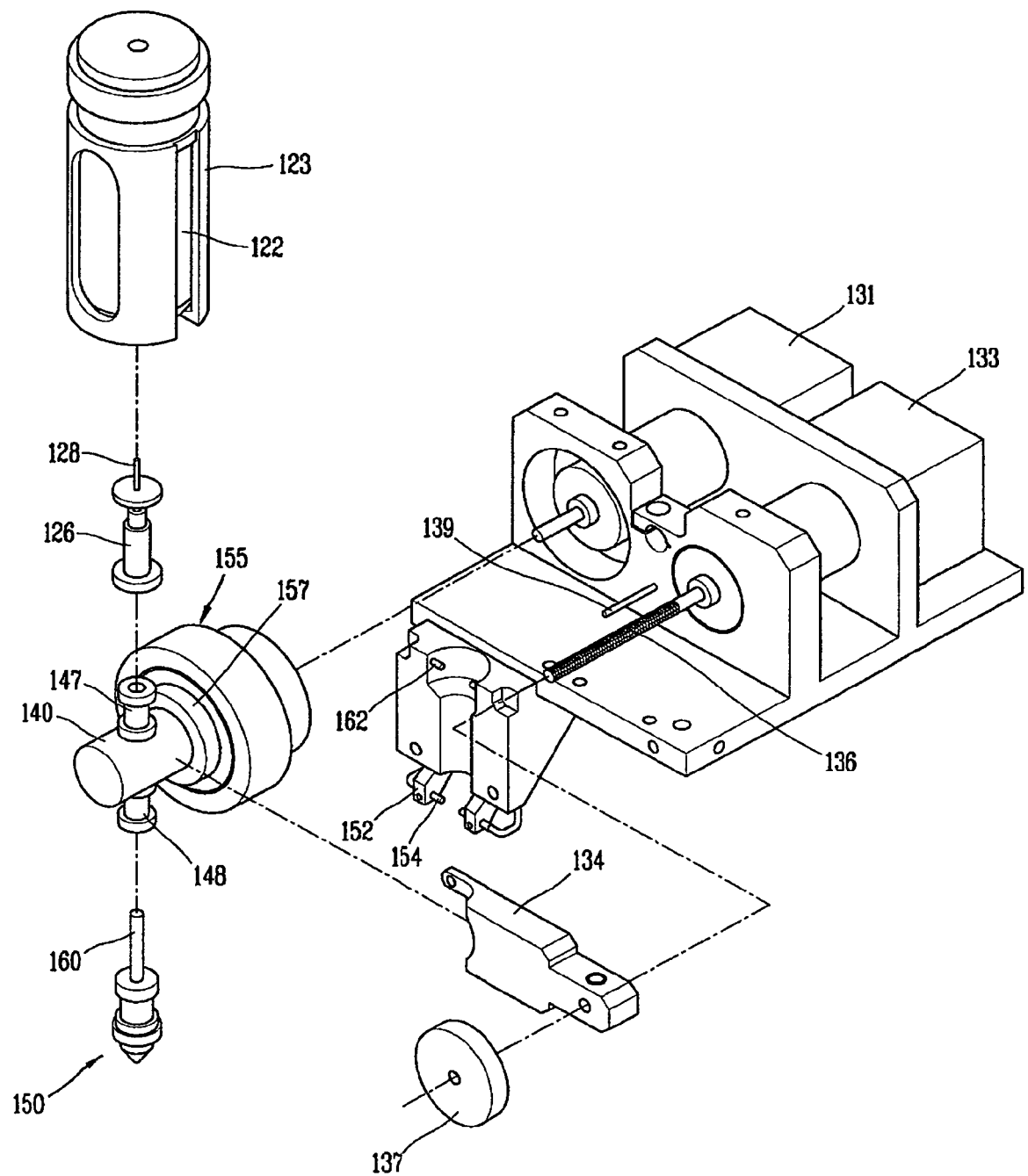
FIG. 8 is an exploded perspective view of the liquid crystal dispensing apparatus in FIG. 7.

FIG. 7 is a perspective view illustrating an exemplary structure of a liquid crystal dispensing apparatus 120 according to the present invention, FIG. 8 is an exploded perspective view of the liquid crystal dispensing apparatus in FIG. 7.

Referring to FIGS. 7 and 8, a liquid crystal material container 122 having a cylindrical shape is accommodated within a case 123 in the liquid crystal dispensing apparatus 120. The liquid crystal material container 122 may be formed of polyethylene and contains a liquid crystal material 107 therein and the case 123 may be formed of stainless steel. Because polyethylene is an easily deformable material, the container 122 can be easily fabricated with a desired shape. Also, polyethylene is non-reactive with the liquid crystal material 107 and it is thus beneficially used to produce the liquid crystal material container 122. However, the polyethylene has a low strength and may therefore become easily deformed by an external impact. When the liquid crystal material container 122 is deformed, the liquid crystal material 107 may not be precisely dispensed onto a substrate. Accordingly, the liquid crystal material container 122 may be inserted within the case 123 formed of stainless steel having a high strength.

Although not shown, a gas supply tube may be arranged at a upper portion of the liquid crystal material container 122 to transport a gas, such as nitrogen, from the exterior. The gas is supplied within portions of the liquid crystal material container 122 not occupied by the liquid crystal material 107. Accordingly, the gas pressure on the liquid crystal material 107 facilitates the liquid crystal material to be dispensed onto the substrate.

The liquid crystal material container 122 may include a material that does not deform, such as stainless steel. Accordingly, when the liquid crystal material container 122 is formed of stainless steel, the case 123 may not be required, thereby reducing fabrication costs of the liquid crystal dispenser 120. In such a case, the interior of the liquid crystal material container 122 may be coated with a fluorine resin to prevent the liquid crystal material 107 contained within the liquid crystal material container 122 from chemically reacting with the sidewalls of the liquid crystal material container 122.

A liquid crystal discharge pump 140 is arranged at a lower portion of the liquid crystal material container 122. The liquid crystal discharge pump 140 discharges a predetermined amount of liquid crystal from the liquid crystal material container 122 onto a substrate. The liquid crystal discharge pump 140 is provided with a liquid crystal suction opening 147 connected to the liquid crystal material container 122 for intaking the liquid crystal material 107 according to the operation of the liquid crystal discharge pump 140, and a liquid crystal discharge opening 148 at the opposite side of the liquid crystal suction opening 147 for discharging the liquid crystal material 107 according to the operation of the liquid crystal discharge pump 140.

Referring to FIG. 8, the liquid crystal suction opening 147 is coupled to a first connecting tube 126. In another aspect of the present invention, the liquid crystal suction opening 147 may be coupled to the first connecting tube 126 by being inserted into the first connecting tube 126 or via a coupling unit (e.g., a screw, or the like). A hollow pin 128 (e.g., an injection needle) is formed at one side of the first connecting tube 126 and a pad (not shown), which is formed of a highly compressible material and capable of forming a hermetic material (e.g., silicon, butyl rubber material, or the like), is arranged at a lower portion of the liquid crystal material container 122 from which the liquid crystal material 107 intakes the first connecting tube 126. The pin 128 is inserted through the pad and into the liquid crystal material container 122 to transport the liquid crystal material 107 in the container 122 into the liquid crystal suction opening 126. Upon insertion of the pin 128, the pad presses against the outside the liquid crystal suction opening 147 to prevent the liquid crystal material 107 from leaking to the insertion region of the pin 128. Thus, because the liquid crystal suction opening 147 and the liquid crystal material container 122 are coupled to each other via a pin/pad structure, the liquid crystal suction opening 147 may be simply coupled and decoupled to the liquid crystal material container 122.

Alternatively, the liquid crystal suction opening 147 may be integrally formed with the first connecting tube 126 to simplify the structure. In this case, the pin 128 is formed at the liquid crystal suction opening 147 and is directly inserted into the liquid crystal material container 122 via the pad to transport the liquid crystal material within the container 122 into the liquid crystal suction opening 147.

A nozzle 150 is arranged at a lower portion of the liquid crystal discharge pump 140. The nozzle 150 is connected to the liquid crystal discharge opening 148 of the liquid crystal discharge pump 140 via a second connecting tube 160 to facilitate discharging the liquid crystal material 107 onto the substrate from the liquid crystal discharge pump 140. The second connecting tube 160 may be formed of an opaque material or a transparent material. When the liquid crystal material 107 contains vapor while being dispensed, dispensing amounts of the liquid crystal material 107 can not be precisely controlled and thus vapor should be removed from the liquid crystal material 107. A vapor-removing device can be used to remove the vapor in the liquid crystal material 107, but it is difficult to completely remove it. Therefore, it is beneficial to stop the operation of the liquid crystal dispensing apparatus and remove the vapor as soon as it is determined that the vapor is present to prevent inferiority of the LCD panel. Accordingly, the second connecting tube 160 may be formed of a transparent material to allow the operator to visually determine the presence of vapor contained within the liquid crystal material 107. The vapor may be detected with the naked eye or a first sensor 162 (e.g., a photo coupler, or the like) arranged at both sides of the second connecting tube 160.

A protection unit 152 is arranged at both sides of the nozzle 150 into which the discharged liquid crystal material is introduced via the second connecting tube 160 and protects the nozzle 150 from external impacts, etc. Further, a second sensor 154 is arranged at the protection unit 152 of the nozzle 150 to detect the presence of vapor within the liquid crystal material dispensed from the nozzle 150 or to detect the presence of the liquid crystal material accumulated on the surface of the nozzle 150.

The actual amount of the liquid crystal material dispensed may deviate from the predetermined amount when the liquid crystal material is accumulated on the surface of the nozzle 150. When the liquid crystal material is accumulated on the nozzle 150, the actual amount of the liquid crystal material dispensed onto the substrate in the form of droplets is less than the predetermined amount. Moreover, portions of the liquid crystal material accumulated on the surface of the nozzle 150 may be dispensed onto the substrate, resulting in a defective LCD panel. Therefore, a material forming a large contact angle with the liquid crystal material, namely, a hydrophobic material such as a fluorine resin or the like may be deposited on the substrate of the nozzle 150 by any suitable method (e.g., dipping, spraying, or the like) to prevent the accumulation of the liquid crystal material on the surface of the nozzle 150. By providing the nozzle 150 with a material like a fluorine resin, the liquid crystal material does not spread over the surface of the nozzle 150, but is dispensed onto the substrate through the nozzle 150 in the form of a perfect droplet.

The liquid crystal discharge pump 140 is inserted into a rotating member 157. The rotating member 157 is fixed to a fixing unit 155 and connected to a first motor 131. As the first motor 131 is driven, the rotating member 157 rotates and the liquid crystal discharge pump 140 fixed to the rotating member 157 operates.

The liquid crystal discharge pump 140 is in contact with one side of a bar-shaped liquid crystal capacity amount controlling member 134. A hole is formed at the other side of the liquid crystal capacity amount controlling member 134 and a rotational shaft 136 is inserted into the hole. A screw at a periphery of the hole is used to couple the liquid crystal capacity amount controlling member 134 to the rotational shaft 136. Also, one end of the rotational shaft 136 is connected to a second motor 133 and the other end is connected to a control lever 137.

An amount of the liquid crystal material dispensed from the liquid crystal discharge pump 140 varies according to a fixation angle of the liquid crystal discharge pump 140 to the rotating member 157 (i.e., the angle at which a portion of the liquid crystal discharge pump 140 is fixed to the rotating member 157). When the second motor 133 connected to the rotational shaft 136 is driven (automatically controlled) or the control lever 137 is manually controlled, the rotational shaft 136 is rotated. Upon rotating the rotational shaft 136, one end of the liquid crystal capacity amount controlling member 134 screw-coupled to the rotational shaft 136 moves back and forth along the linear direction of the rotational shaft 136. Accordingly, as one end of the liquid crystal capacity amount controlling member 134 moves, a force applied to the liquid crystal discharge pump 140 and the fixation angle of the liquid crystal discharge pump 140 are changed.

Accordingly, the first motor 131 causes the liquid crystal discharge pump 140 to dispense the liquid crystal material from the liquid crystal material container 122 onto the substrate, and the second motor 133 controls the fixation angle and thus an amount of the liquid crystal material dispensed from the liquid crystal discharge pump 140.

An amount of a single droplet of the liquid crystal material dispensed is very minute, and thus a variation amount of the liquid crystal discharge pump 140 controlled by the second motor 133 is also very minute. Therefore, an inclination angle (i.e., the fixation angle) of the liquid crystal discharge pump 140 has to be controlled very precisely to control the discharge amount of the liquid crystal discharge pump 140. To effect such a precise control in the fixation angle, a step motor operated by a pulse input value may be used as the second motor 133.

Figure 9A:
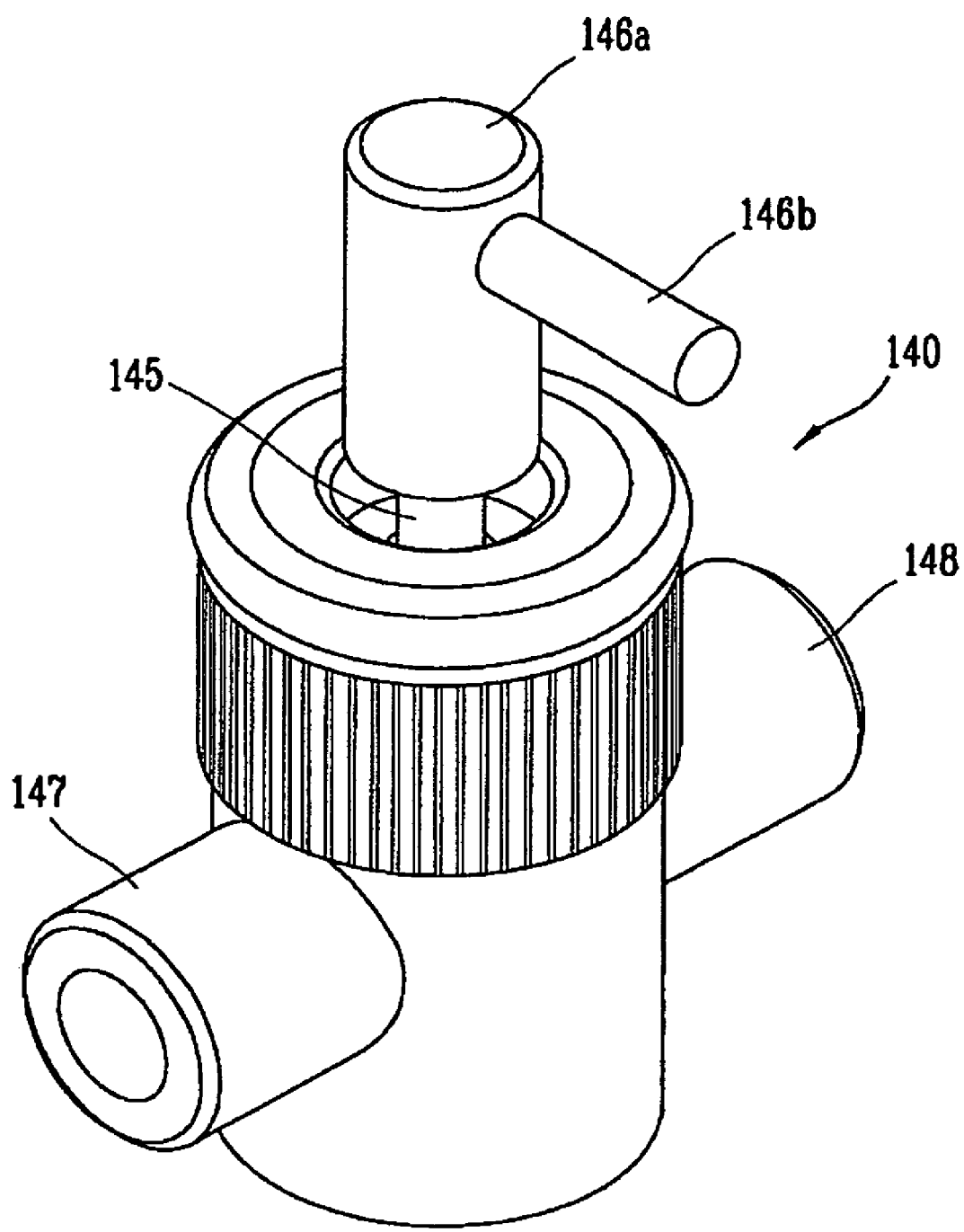
FIG. 9A is a perspective view of a liquid crystal discharge pump of the liquid crystal dispensing apparatus according to the present invention.
Figure 9B:
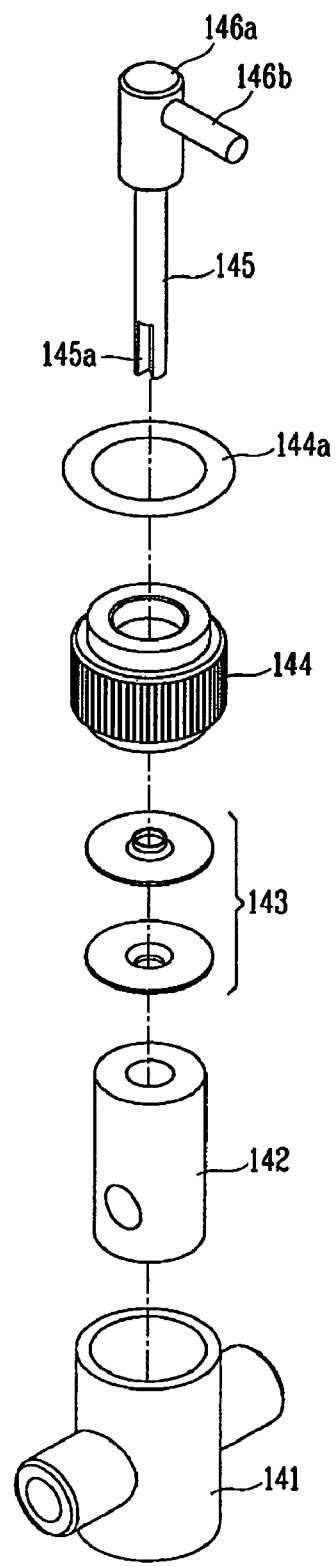
FIG. 9B is an exploded perspective view of the liquid crystal discharge pump.

FIG. 9A is a perspective view of the liquid crystal discharge pump 140 of the liquid crystal dispensing apparatus. FIG. 9B is an exploded perspective view of the liquid crystal discharge pump 140.

Referring to FIGS. 9A and 9B, the liquid crystal discharge pump 140 includes: a case 141 wherein the case 141 includes the liquid crystal suction and discharge openings 147 and 148; a cap 144 coupled to the case 141, wherein an upper portion of the cap 144 includes an opening; a cylinder 142 inserted into the case 141 for conveying the liquid crystal material intaken from the liquid crystal container 123; a sealing device 143 for sealing the cylinder 142; an o-ring 144a arranged at a upper portion of the cap 144 for preventing the liquid crystal material from leaking outside the liquid crystal discharge pump 140; and a piston 145 inserted into the cylinder 142 through the opening of the cap 144, the piston 145 rotating and moving upwardly and downwardly within the cylinder 142 for intaking and discharging the liquid crystal material through the liquid crystal suction and discharge openings 147 and 148, respectively.

A head 146a is arranged at a upper portion of the piston 145 and fixed to the rotating member 157 (FIG. 8), and a bar 146b is arranged at the head 146a and inserted and fixed to a hole (not shown) of the rotating member 157. Accordingly, the piston 145 may rotate when the rotating member 157 is rotated by the first motor 131. A groove 145a is formed at an end portion of the piston 145. The groove 145a occupies no more than about 25% of a cross-sectional area of the piston 145. The groove 145a may open and close the liquid crystal suction openings 147 and 148 when the piston 145 is rotated to intake and discharge the liquid crystal material to the liquid crystal discharge opening 148 through the liquid crystal suction opening 147.

Figure 10:
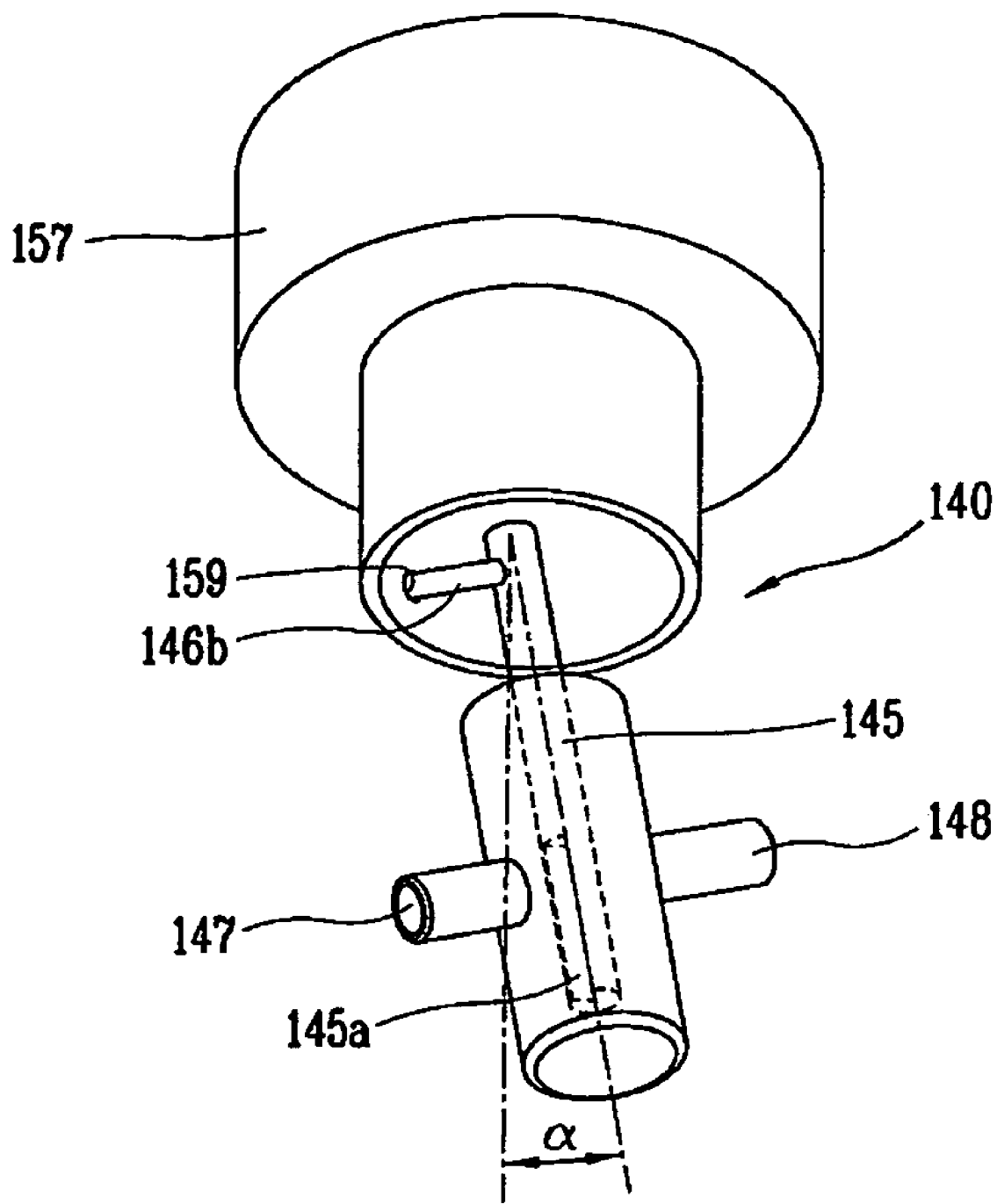
FIG. 10 is a schematic view illustrating the liquid crystal discharge pump fixed to the fixing member.

An operation of the liquid crystal discharge pump 140 will now be described with reference to FIG. 10. FIG. 10 is a view illustrating the liquid crystal discharge pump 140 fixed to the rotating member 157.

Referring to FIG. 10, the piston 145 of the liquid crystal discharge pump 140 is fixed to the rotating member 157 at a predetermined angle, α (i.e., the fixation angle). The bar 146b formed at the piston head 146a is inserted into a hole 159 formed within the rotating member 157 to couple the piston 146 to the rotating member 157. A bearing (not shown) is provided within the hole 159 to allow the bar 146b of the piston 145 to move back and forth and in right and left directions with respect to the hole 159. When the first motor 131 is driven, the rotating member 157 rotates and thus the piston 145 coupled (i.e., fixed) to the rotating member 157 rotates.

If the fixation angle (α) of the liquid crystal discharge pump with respect to the rotating member 157, the fixation angle (α) of the piston 145 with respect to the rotating member 157, is 0°, the piston 145 performs only a rotational motion along the rotating member 157. However, because the fixation angle (α) of the piston 145 with respect to the rotating member 157 is substantially not 0° (i.e., because the piston is fixed at a certain angle), the piston 145 not only rotates along the rotating member 157 but also moves vertically.

When the piston 145 moves upwardly by rotating with a certain angle, a space is formed inside the cylinder 142 and the liquid crystal material is intaken to the space through the liquid crystal suction opening 147. Then, when the piston 145 moves downwardly by rotating more, the liquid crystal material in the cylinder 142 is discharged through the liquid crystal discharge opening 148. The groove 145a formed at the piston 145 opens and closes the liquid crystal suction and discharge openings 147 and 148 by the rotation of the piston 145.

Figure 11A:
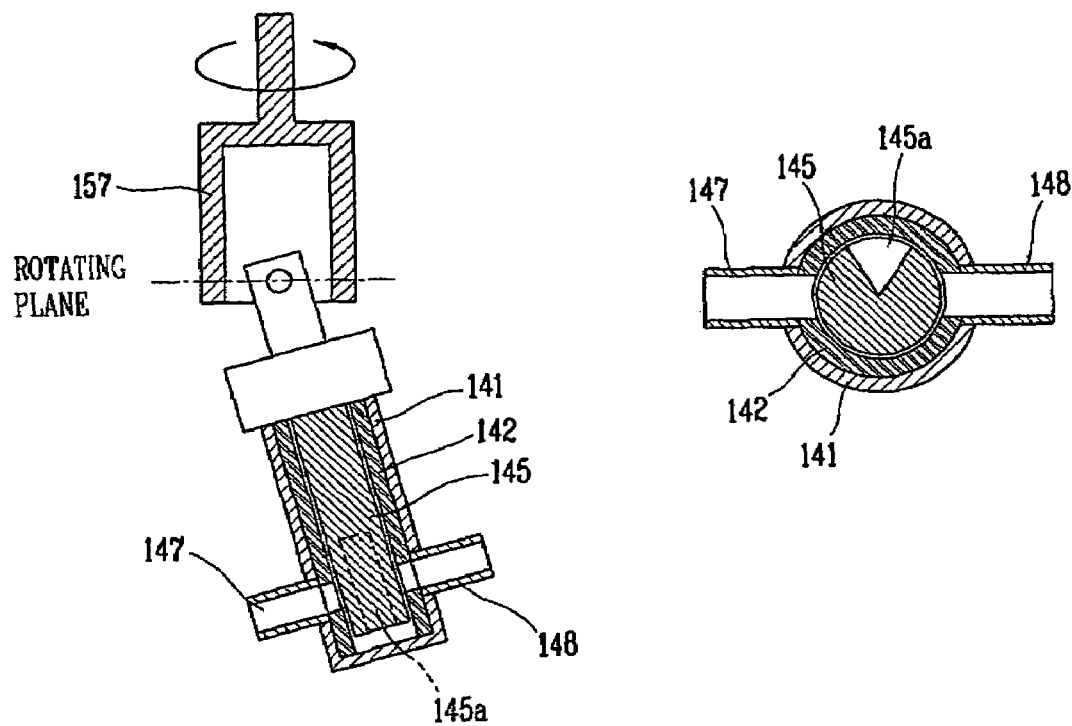
FIGS. 11A to 11D are operational views of the liquid crystal discharge pump according to the present invention.
Figure 11B:
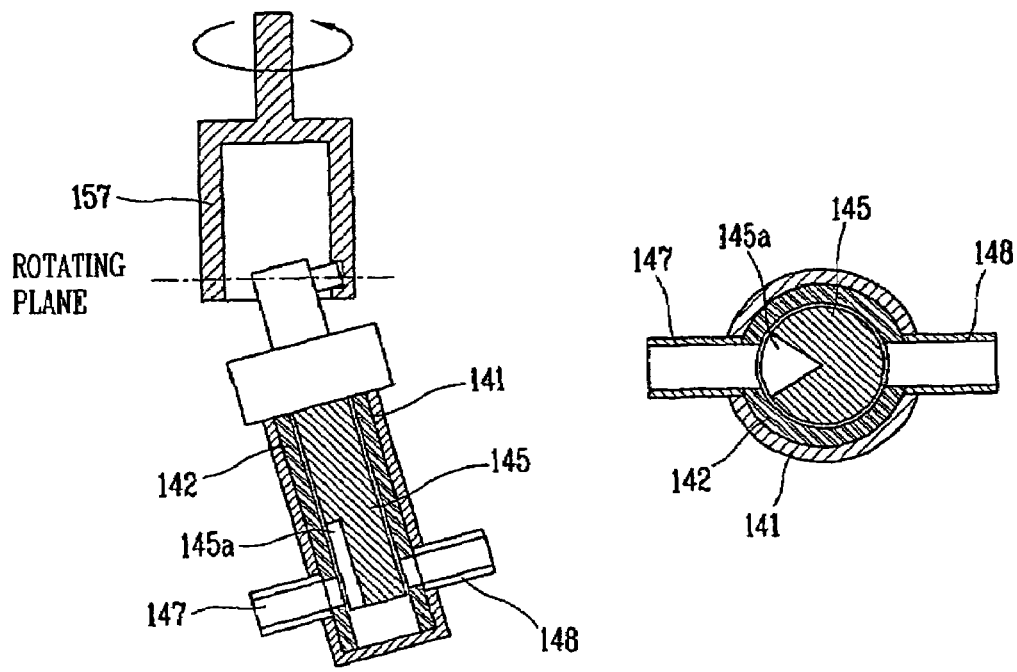
Figure 11C:
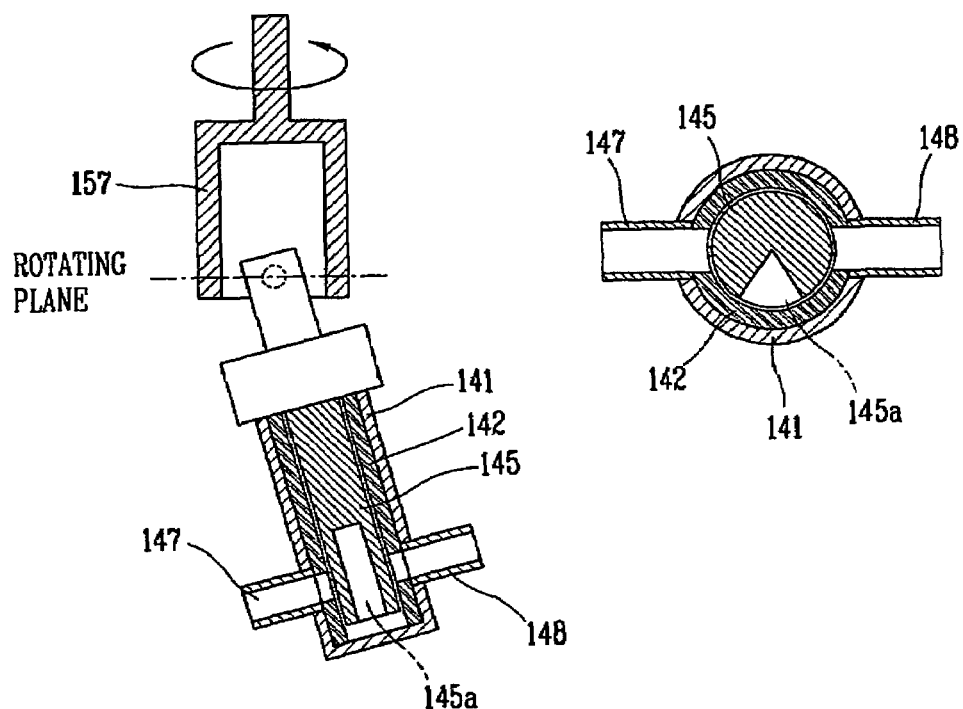
Figure 11D:
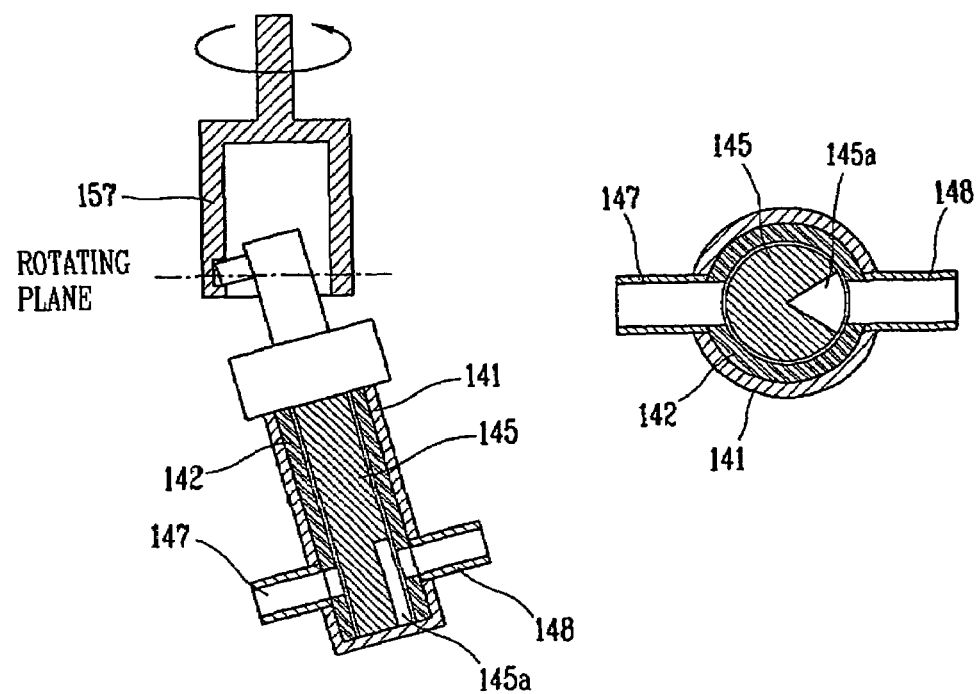

The operation of the liquid crystal discharge pump 140 will now be described in more detail with respect to FIGS. 11A to 11D. In FIGS. 11A to 11D, a liquid crystal material contained within the liquid crystal material container 122 is discharged to the nozzle 150 through four strokes of the liquid crystal discharge pump 140. FIGS. 11A and 11C illustrate cross strokes; FIG. 11B illustrates a suction stroke at the liquid crystal suction opening 147; and FIG. 11D illustrates a discharge stroke at the liquid crystal discharge opening 148.

Referring to FIG. 11A, the piston 145 fixed to the rotating member 157 at a certain fixation angle (α), rotates in accordance with the rotation of the rotating member 157. In the cross stroke illustrated in FIG. 11A, the piston 145 closes both the liquid crystal suction opening 147 and the liquid crystal discharge opening 148.

When the rotating member 157 rotates by approximately 45°, the piston 145 rotates within the cylinder 142 to arrange the groove 145a to open the liquid crystal suction opening 147 (i.e., to be in fluid communication with the liquid crystal suction opening 147) as illustrated in FIG. 11B. The bar 146b of the piston 145 is inserted into the hole 159 of the rotating member 157 to couple the rotating member 157 to the piston 145. Accordingly, the piston 145 rotates according to the rotation of the rotating member 157 while the bar 146b rotates along a rotation plane.

Because the piston 145 is fixed to the rotating member 157 at a predetermined fixation angle and the bar 146b rotates along the rotation plane, the piston 145 moves upwardly according to the rotation of the rotating member 157, leaving a space in the fixed cylinder 142 thereunder. Thus, the liquid crystal material is intaken to the space of the cylinder 142 through the liquid crystal suction opening 147 opened by the groove 145a.

After the suction stroke is started (i.e., after the liquid crystal suction opening 147 is opened), the suction of the liquid crystal material continues until the cross stroke illustrated in FIG. 11C starts (i.e., until the liquid crystal suction opening 147 is closed) as the rotating member 157 further rotates by approximately 45°.

Referring to FIG. 11D, as the rotating member 157 further rotates, the piston 145 moves downwardly and rotates within the cylinder 142 to arrange the groove to open the liquid crystal discharge opening 148 (i.e., to be in fluid communication with the liquid crystal discharge opening 148). As the groove 145a opens the liquid crystal discharge opening 148, the liquid crystal material is discharged from the cylinder 142 and groove 145a through the liquid crystal discharge opening 148 (discharge stroke).

As described above, the liquid crystal discharge pump 140 repeats four consecutive strokes (i.e., the first cross stroke, the suction stroke, the second cross stroke, and the discharge stroke), to discharge the liquid crystal material contained in the liquid crystal material container 122 to the nozzle 150. An amount of the liquid crystal material discharged from the liquid crystal discharge pump 140 may vary according to the degree to which the piston 145 moves upwardly and downwardly. The degree to which the piston 145 moves is regulated by the fixation angle at which the liquid crystal discharge pump 140 is fixed to the rotating member 157.

Figure 12:
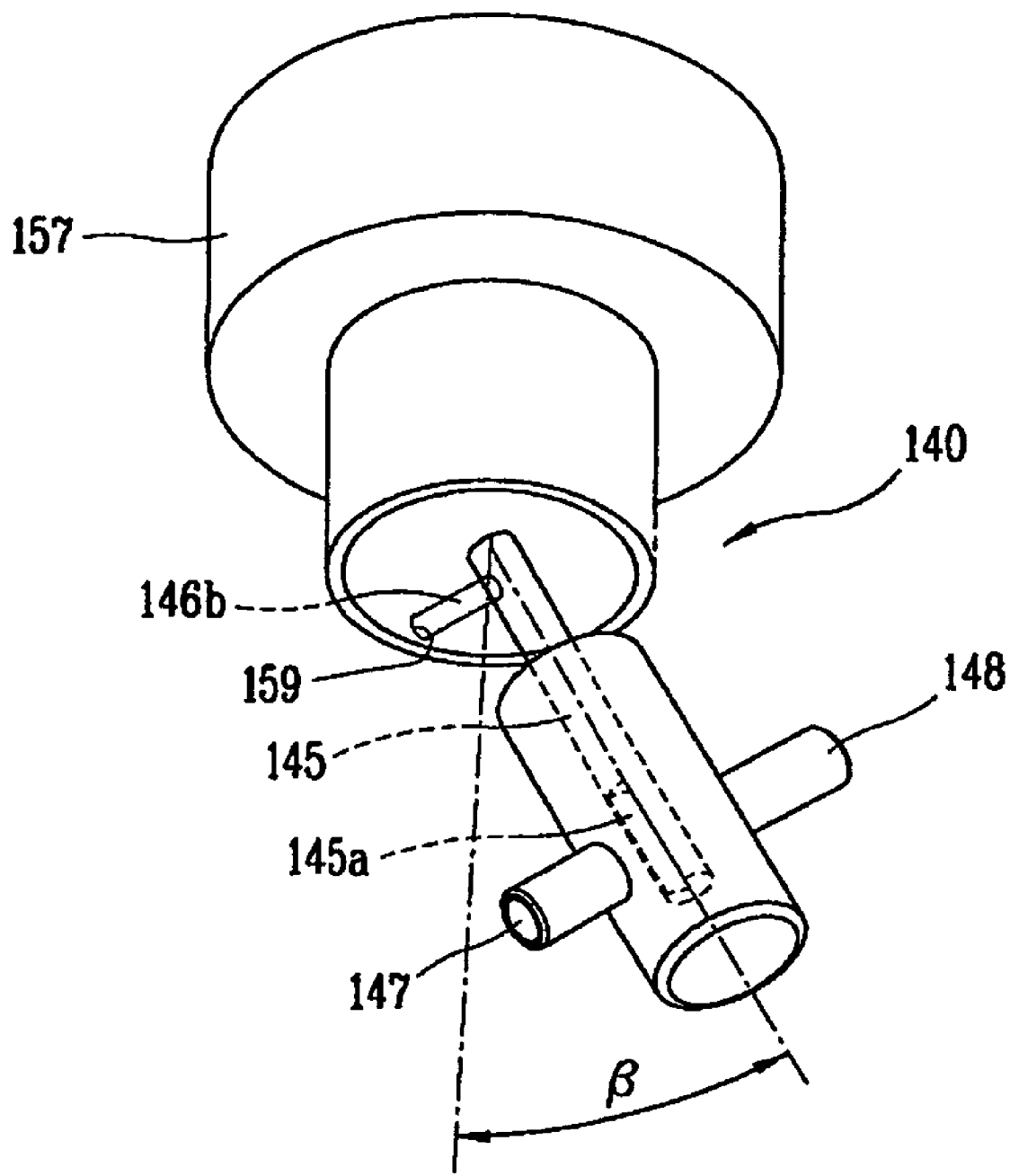
FIG. 12 a schematic view illustrating the liquid crystal discharge pump fixed to a fixing member at an increased fixation angle.

FIG. 12 a schematic view illustrating the liquid crystal discharge pump fixed to the rotating member at a predetermined angle β.

The liquid crystal discharge pump 140 in FIG. 10 is fixed to the rotating member 157 at a fixation angle α. However, the liquid crystal discharge pump 140 in FIG. 12 is fixed to the rotating member 157 at a fixation angle of β, wherein β>α. Accordingly, the degree of an ascent of the piston 145 with respect to the rotating member 157 illustrated in FIG. 12 is greater than the degree of an ascent of the piston 145 illustrated in FIG. 10. As the fixation angle increases, the degree to which the piston moves upwardly increases and an amount of the liquid crystal material intaken to the cylinder 142 also increases. This means that an amount of the liquid crystal material discharged from the liquid crystal discharge pump 140 can also be controlled by the fixation angle.

As illustrated in FIG. 7, the fixation angle is controlled by the liquid crystal capacity amount controlling member 134. The liquid crystal capacity controlling member 134 is moved by driving the second motor 133. Therefore, the fixation angle of the liquid crystal discharge pump 140 can be controlled by controlling the second motor 133.

Alternatively, the fixation angle can be manually controlled by adjusting an angle control lever 137. However, in this case, a precise adjustment is difficult, it takes a long time to perform the adjusting process, and the operation of the liquid crystal discharge pump must be interrupted for the adjusting process. Accordingly, it is beneficial that the fixation angle of the liquid crystal discharge pump 140 is controlled by the second motor 133.

The fixation angle of the liquid crystal discharge pump 140 is measured by a sensor 139 such as a linear variable differential transformer. When the fixation angle exceeds a predetermined angle, the sensor 139, for example, turns on an alarm to prevent the liquid crystal discharge pump 140 from being damaged.

As described above, the liquid crystal dispensing apparatus 120 having the liquid crystal discharge pump 140 applies a liquid crystal material onto at least one unit panel formed on one of the substrates. In general, a plurality of unit panels are formed on the substrate. Thus, a plurality of the liquid crystal dispensing apparatuses 120 are used to dispense a liquid crystal material onto the substrate, thereby improving the fabrication efficiency.

Figure 13:
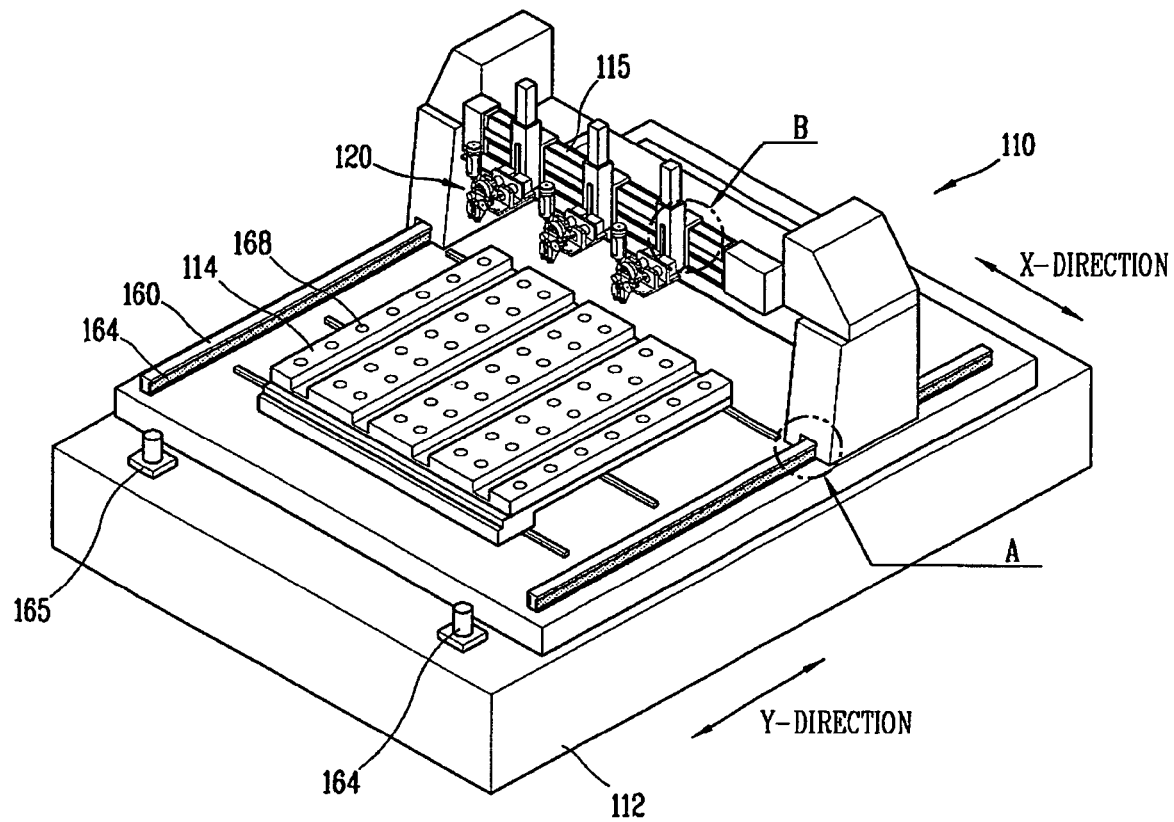
FIG. 13 a schematic view illustrating a liquid crystal dispensing system having a plurality of liquid crystal dispensing apparatuses.

FIG. 13 a schematic view illustrating a liquid crystal dispensing system 110 having a plurality of liquid crystal dispensing apparatuses 120.

Referring to FIG. 13, a liquid crystal dispensing system 110 includes a stage 114 positioned at a frame 112 and a guide bar 115 installed over the stage 114. A liquid crystal material will be dispensed on a substrate laid on the stage 114. The plurality of liquid crystal dispensing apparatuses 120 are installed at the guide bar 115. Although the liquid crystal dispensing system 110 only includes three liquid crystal dispensing apparatuses 120, it should be appreciated that the number of the liquid crystal dispensing apparatuses 120 at the guide bar 115 is not limited thereto. That is, the number of the liquid crystal dispensing apparatuses 120 provided at the guide bar 115 may vary, for example, according to the number of the unit panels.

A motor mounted within the guide bar 115 moves the guide bar 115 in a y-direction over the stage 114 along a guide rail 160 formed on the stage 114. As the guide bar is moved, the plurality of liquid crystal dispensing apparatuses 120 are also moved in the y-direction. A linear motor can be used as the motor mounted within the guide bar 115. Also, each of the liquid crystal dispensing apparatuses 120 installed at the guide bar 115 includes a motor (e.g., a linear motor) and thus it can be moved in a x-direction along the guide bar 115.

Instead of moving the guide bar 115, the stage 114 can be moved in the x and y directions by a driving unit (not shown) (e.g., a motor, or the like) with respect to the guide bar. In such a case, the substrate laid on the stage 114 may be displaced from its original position. Thus, suction holes 168 connected to a vacuum pump (not shown) may be formed at the stage 114 to fix the substrate to the stage 114. Although not shown in the drawings, the substrate can be fixed to the stage 114 by an electrostatic suction using static electricity or vacuum and electrostatic suction using vacuum and static electricity.

One side of the frame 112 is provided with at least one weight measurement scale 164 for measuring an amount of the liquid crystal material to be dispensed onto the substrate. After dispensing a liquid crystal material onto the set number of substrates, the liquid crystal dispensing apparatuses 120 are moved to the weight measurement scale 164 and dispense the liquid crystal material into a measuring container 165 installed on the weight measurement scale 164 to measure the dispensing amounts thereof. An electronic scale can be used as the weight measurement scale 164 to accurately measure an amount of the liquid crystal material dispensed in the measuring container 165. Also, because an amount of a single droplet of the liquid crystal material is very minute, the weight measurement scale 164 measures a total amount of the liquid crystal material after dispensing a set number droplets (e.g., 50 or 100) in the measuring container 165. An amount of a single droplet of the liquid crystal material may be obtained by dividing a weight of the total amount measured by the weight measurement scale 40 by the number of times being dispensed. Also, an actual amount of a single droplet of the liquid crystal material can be obtained by converting the weight of a single droplet of the liquid crystal material into a value of volume.

Such operations of the liquid crystal dispensing apparatuses 120 are controlled by a controller. The controller calculates dispensing amounts and dispensing positions, and thereafter controls the liquid crystal dispensing system 110 having the liquid crystal dispensing apparatuses 120 to dispense the liquid crystal material onto the substrate.

Figure 14:
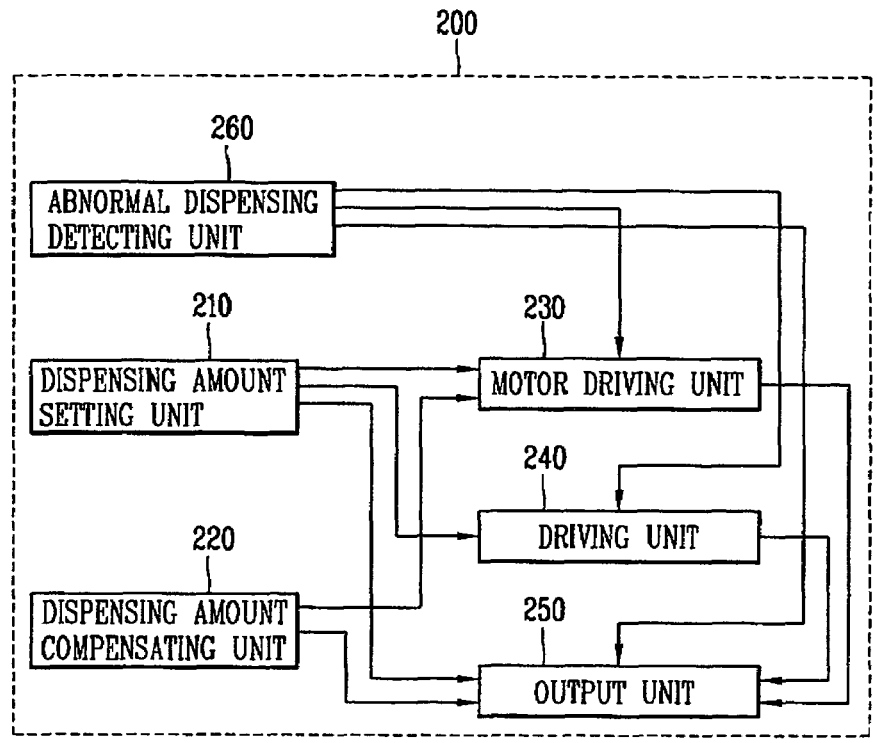
FIG. 14 is a block diagram illustrating a structure of a controller of a liquid crystal dispensing system according to the present invention.

FIG. 14 is a block diagram illustrating a structure of a controller of a liquid crystal dispensing system according to the present invention.

Referring to FIG. 14, the controller 200 may include: an abnormal dispensing detecting unit 260 for detecting an abnormal dispensing caused by an external impact such as an earthquake; a dispensing amount setting unit 210 for setting a dispensing amount of a liquid crystal material based on various information in the absence of an abnormal dispensing; a dispensing amount compensating unit 220 for compensating the dispensing amount of the liquid crystal material by controlling the second motor 133 to adjusting a fixation angle of the liquid crystal discharge pump 140 when the dispensing amount of liquid crystal material set by the dispensing amount setting unit 210 is different from an actual amount of the liquid crystal material dispensed onto the substrate (or a unit panel); a motor driving unit 230 for discharging the liquid crystal material as much as the dispensing amount set by the dispensing amount setting unit 210 through the liquid crystal discharge pump 140 by controlling the first and second motors 131 and 133; a substrate driving unit 240 for aligning the substrate to the dispensing positions of the nozzles 150; and an output unit 250 for outputting various information such as the sizes of the substrate and unit panel, a set dispensing amount of the liquid crystal material, a current dispensing amount, dispensing positions, and the like, and for informing a user of an abnormal dispensing.

The output unit 250 may include a display such as a Cathode Ray Tube (CRT), an LCD device or a printer to provide the user with various information with respect to the dispensing and inform the user of an abnormal dispensing using an alarm or the like.

The dispensing amount setting unit 210 sets an amount of the liquid crystal material to be dispensed onto the substrate (or unit panel). The user can input a set amount previously calculated by manually driving the dispensing amount setting unit 210, but it is beneficial to automatically set a dispensing amount of the liquid crystal material based on various data for more accurate control. The dispensing amount of the liquid crystal material may be calculated using various information such as an area of the unit panel, a display mode of the unit panel such as Twisted Nematic (TN) mode or In Plane Switching (IPS) mode, an alignment direction formed at the alignment layer, a viscosity of the liquid crystal material, and the like. When the set dispensing amount is different from an actual amount of the liquid crystal material dispensed onto the substrate, the dispensing amount compensating unit 210 compensates the dispensing amount to prevent a fabrication of a defective LCD device.

Figure 15:
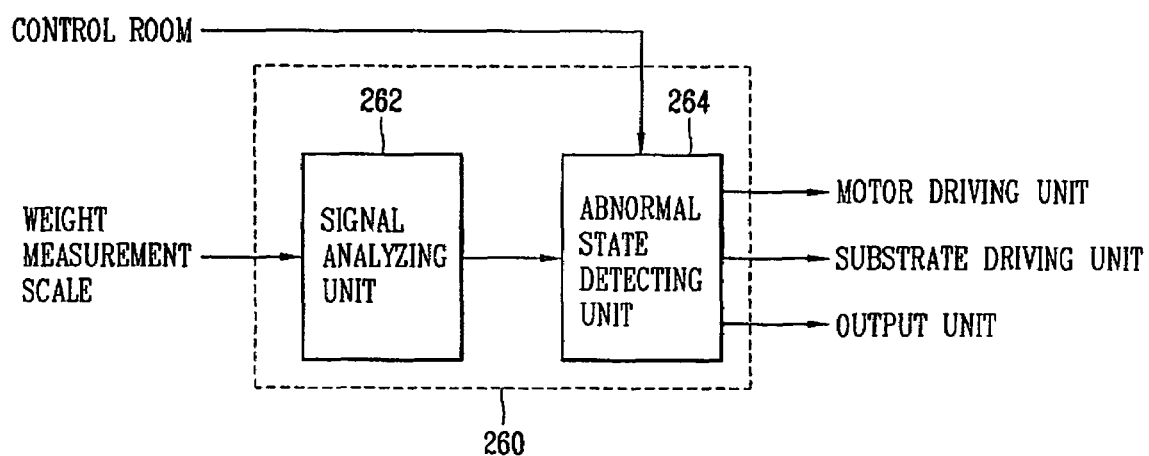
FIG. 15 is a block diagram illustrating a structure of an abnormal dispensing detecting unit of a liquid crystal dispensing system according to the present invention.

FIG. 15 is a block diagram illustrating a structure of an abnormal dispensing detecting unit of a liquid crystal dispensing system according to the present invention.

Referring to FIG. 15, the abnormal dispensing detecting unit 260 may include a signal analyzing unit 262 for analyzing a signal inputted from the weight measurement scale 164, and an abnormal state detecting unit 264 for detecting an abnormal dispensing based on the analyzed result from the signal analyzing unit 262.

As described above, the weight measurement scale 164 is an electronic scale which has a load cell for outputting an electronic signal according to a variation of weight. Therefore, as the liquid crystal material is dispensed into the measuring container 165, a signal with an amplitude corresponding to its weight is outputted. The liquid crystal material dispensed into the measuring container 165 is dispensed (or dropped) from a certain height through the liquid crystal dispensing apparatus 120. As soon as the liquid crystal material contacts the measuring container 165, an impact is applied onto the weight measurement scale 164 to cause the weight measurement scale 164 to vibrate. Initial dispensing of the liquid crystal material may generate the greatest oscillation, and then the oscillation may decrease as time goes by. Accordingly, the signal outputted from the weight measurement scale 164 may have a sinusoidal shape. The signal has the greatest amplitude at the initial dispensing of the liquid crystal material, and its amplitude decreases as time elapses and arrives at the amplitude corresponding to the weight of the dispensed liquid crystal material.

The signal analyzing unit 262 analyzes the signal inputted from the weight measurement scale 164. That is, the signal analyzing unit 262 analyzes when the signal is inputted, an amplitude of the signal, a duration of the oscillation of the signal, and the like, and thereafter outputs the analyzed data to the abnormal state detecting unit 264.

An external impact such as an earthquake influences on the weight measurement scale 164. In other words, when an earthquake occurs, the weight measurement scale 164 vibrates and outputs a sinusoidal signal of which amplitude decreases as time elapses.

While the liquid crystal material is dispensed onto the substrate from the liquid crystal dispensing apparatus 120, that is, when the liquid crystal material is not dispensed into the measuring container 165 of the weight measurement scale 164, no signal should be outputted from the weight measurement scale 164. However, when there is an external impact such as an earthquake, the weight measurement scale 164 vibrates and outputs a signal. When the weight measurement scale 164 outputs a signal except the duration for measuring the dispensing amount, the abnormal state detecting unit 264 determines that an abnormal dispensing has been generated due to an external impact such as an earthquake, or the like. As a result, the abnormal state detecting unit 264 outputs a signal to the motor driving unit 230 and the substrate driving unit 240 to pause the dispensing of the liquid crystal material, and outputs a signal to the output unit 250 to thereby inform a user of the abnormal dispensing.

When the liquid crystal material is dispensed onto the measuring container 165 of the weight measurement scale 164, the abnormal state detecting unit 264 compares the signal data inputted from the signal analyzing unit 262 with set values. The abnormal state detecting unit 264 stores information on amplitudes and durations of the signals outputted from the weight measurement scale 164 when the liquid crystal material is dispensed onto the measuring container 165 for a measurement. Thus, when the signal inputted from the weight measurement scale 164 exceeds the stored amplitudes and durations, the abnormal state detecting unit 264 determines that the oscillation of the signal is not caused by dispensing the liquid crystal material but caused by an external impact such as an earthquake.

In general, because the dispensing amount of liquid crystal material is minute, a deviation of the dispensing amount is also minute. Accordingly, the amplitudes or durations of the signals outputted by the dispensing of the liquid crystal material may be relatively narrower or shorter than the amplitude or duration of the signal outputted by an external force (impact) such as an earthquake. Therefore, when the signal analyzed by the signal analyzing unit 262 is greater than a set value, the abnormal state detecting unit 264 determines that the oscillation is caused by an external impact such as an earthquake, not by the dispensing of the liquid crystal material and outputs a signal to the motor driving unit 230 and the substrate driving unit 240 to stop the dispensing of the liquid crystal material.

Thus, in the liquid crystal dispensing system according to the present invention, when an external impact such as an earthquake or the like is applied, such information is notified to a user and a signal is simultaneously outputted to the motor driving unit 230 and the substrate driving unit 240 to thus pause the operation of the liquid crystal dispensing apparatuses 120.

The abnormal dispensing detecting unit 260 continues to analyze the signal inputted from the weight measurement scale 164 even when the operation of the liquid crystal dispensing apparatus 120 is paused. When a oscillation of the inputted signal is smaller than a set range, the abnormal dispensing detecting unit 260 determines that the external impact no longer affects the dispensing process and thus outputs a signal to the motor driving unit 230 and the substrate driving unit 240 to restart the dispensing of the liquid crystal material.

As described above, when an impact occurs from the exterior (e.g., when an earthquake occurs), the dispensing of the liquid crystal material is paused according to the present invention. As a result, a defect of an LCD panel generated when the dispensing amount of the liquid crystal material can not be accurately measured due to such an external impact can be prevented. A defect of an LCD panel generated by an inaccurate dispensing position caused by the oscillation of the liquid crystal dispensing apparatus due to such an external impact can also be prevented. Moreover, when the external impact no longer affects the dispensing of the liquid crystal material, the liquid crystal dispensing system restarts the dispensing of the liquid crystal to prevent pausing of the processing line for a long time.

As illustrated in FIG. 15, a control room for controlling an entire fabrication processing line of LCD devices can directly input a signal into the abnormal state detecting unit 264 for informing of an occurrence of such an earthquake. The control room has a measuring device (not shown) for detecting the occurrence of an earthquake to thus directly input a signal (i.e., a oscillation signal) measured by the measuring device into the abnormal state detecting unit 264. Even in such a case, the abnormal state detecting unit 264 compares the inputted signal with a set signal (i.e., a new signal stored in the abnormal dispensing detecting unit 260 for comparison with a oscillation signal inputted from the earthquake measuring device, not the stored signal for comparison with a oscillation signal inputted from the weight measurement scale 164), and determines whether to pause or restart the operation of the liquid crystal dispensing apparatus 120.

In the liquid crystal dispensing system according to the present invention, the dispensing of liquid crystal material is paused or restarted by determining the existence of an external impact using the signal inputted from the weight measurement scale 164 and the signal directly inputted from the control room. However, according to the present invention, various modifications and alterations can occur without departing from the spirit of the invention. For example, an external impact may be determined according to either the signal inputted from the weight measurement scale 164 or the signal directly inputted from the control room.

Figure 16:
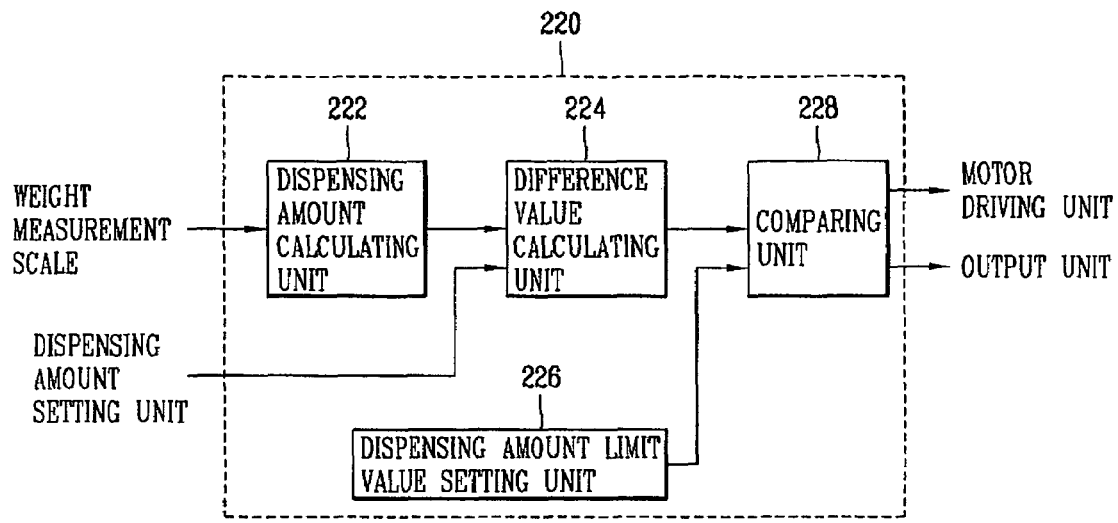
FIG. 16 is a block diagram illustrating a structure of a dispensing amount compensating unit of a liquid crystal dispensing system according to the present invention.

FIG. 16 is a block diagram illustrating a structure of a dispensing amount compensating unit of a liquid crystal dispensing system according to the present invention.

Referring to FIG. 16, a weight measured by the weight measurement scale 164 is inputted in the dispensing amount compensating unit 220. A density of the liquid crystal material being dispensed is stored in a dispensing amount calculating unit 222, and thus the current dispensing amount of the liquid crystal material can be calculated based on the measured weight. The actual dispensing amount of the liquid crystal material calculated in the dispensing amount calculating unit 222 is inputted into a difference value calculating unit 224. The difference value calculating unit 224 calculates a difference between the inputted actual dispensing amount and a dispensing amount set by the dispensing setting unit 221 and thereafter inputs the difference into a comparing unit 228.

A dispensing amount limit value set by a dispensing amount limit value setting unit 226 is inputted into the comparing unit 228. The dispensing amount limit value is a value between the set value of the liquid crystal material to be dispensed and the measured value of the liquid crystal material actually measured. A single or plural dispensing amount limit values can be set. When a single dispensing amount limit value is used, it can refer to a permitted value of an amount of the liquid crystal material to be dispensed onto the unit panel. That is, when the dispensing of the liquid crystal material is performed with a deviation within the limit value, a defective LCD device may not be fabricated. When two or more dispensing amount limit values are used, each value may be used for a different object. For instance, when two dispensing amount limit values are used, the first limit value defines a permitted value of an amount of the liquid crystal material and the second limit value defines a threshold value of an amount of the liquid crystal material that can causes a defect in the dispensing process.

In other words, when the comparing unit 228 determines that the difference between the actual dispensing amount of the liquid crystal material and the set dispensing amount is within the first limit value, a defective LCD device may not be fabricated in the dispensing process and the dispensing process continues. When the difference exceeds the first limit value and is within the second limit value, the motor driving unit 230 outputs a driving signal corresponding to a difference value between the difference between the set dispensing amount and the actually measured dispensing value ("dispensing amount compensated value") and the first limit value and thus compensates the dispensing amount of the liquid crystal material to allow the difference to be within the first limit value. However, when the difference exceeds the second limit value, the liquid crystal dispensing system recognizes it as an abnormal dispensing, pauses the dispensing of the liquid crystal material, and informs the user of the occurrence of the abnormal dispensing by outputting, for example, an alarm using the output unit 250.

The first and second limit values may be determined according to a viscosity of liquid crystal material, a size of unit panel and a dispensing pattern. The measured value is inputted into the dispensing amount calculating unit 222 in real time from the weight measurement scale 164, and the compensation of the dispensing amount is performed in real time based on the inputted information. Therefore, the dispensing amount of the liquid crystal material can be compensated in a short time, thereby preventing a fabrication of a defective LCD device.

The dispensing amount calculating unit 222 can calculate an amount of a single droplet of the liquid crystal material or a dispensing amount of the liquid crystal material corresponding to one unit panel or one substrate. An amount of a single droplet of the liquid crystal material is a very small amount (e.g., several milligrams). Thus, it is difficult to calculate an amount of a single droplet of the liquid crystal material by measuring the weight of a single droplet. Therefore, 50 or 100 droplets are dispensed into the measuring container 164, and the combined weight is measured. The measured weight value is divided by the number of the droplets dispensed to measure a weight of an amount of a single droplet. The measured weight of an amount of a single droplet is then converted into a value of volume to thus measure an actual amount of a single droplet of the liquid crystal material. Also, an actual amount of the liquid crystal material dispensed onto one substrate or one unit panel can be calculated based on, for example, a dispensing pattern (e.g., the number of times being dispensed).

Such a measurement can be performed after the liquid crystal material is completely dispensed onto one unit panel or one substrate, but it may be beneficial to perform such a measurement after the liquid crystal material is completely dispensed onto the set number of unit panels or substrates.

Figure 17:
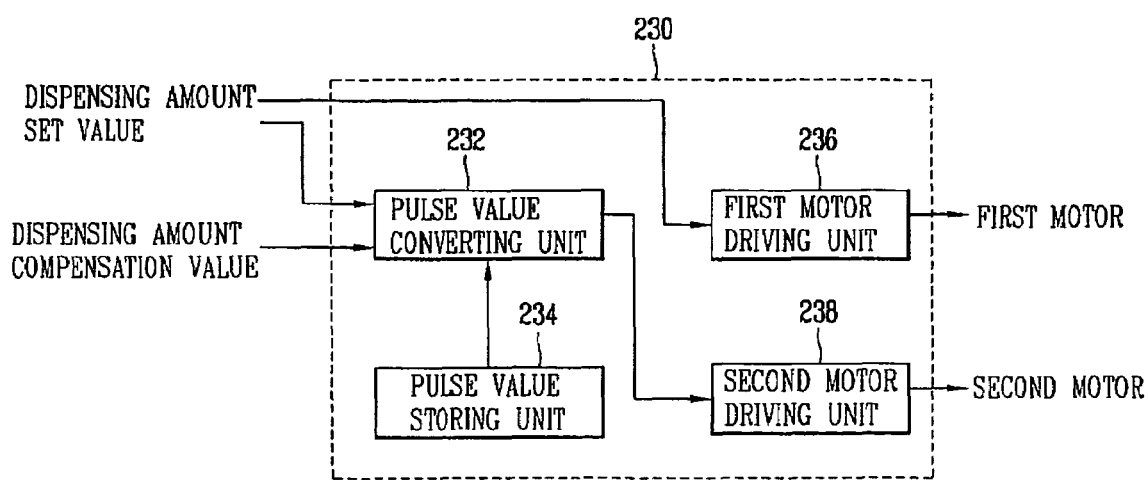
FIG. 17 is a block diagram illustrating a structure of a motor driving unit of a liquid crystal dispensing system according to the present invention.

FIG. 17 is a block diagram illustrating a structure of a motor driving unit of a liquid crystal dispensing system according to the present invention.

Referring to FIG. 17, the motor driving unit 230 may include: a pulse value storing unit 234 for storing pulse value information with respect to the dispensing amount of the liquid crystal material to drive the first and second motors 131 and 133; a pulse value converting unit 232 for converting the dispensing amount set value inputted from the dispensing amount setting unit 210 and the dispensing amount compensated value inputted from the dispensing amount compensating unit 220 into pulse values based on the pulse value information stored in the pulse value storing unit 234; a first motor driving unit 236 for outputting a driving signal to drive the first motor 131 in response to an input of the dispensing amount set value; and a second motor driving unit 238 for outputting a driving signal to drive the second motor 133 and thus change a fixation angle of the liquid crystal discharge pump 140 in response to an input of the pulse value converted by the pulse value converting unit 232.

The pulse value storing unit 234 stores rotating angle information of the second motor 133 with respect to a number of pulse values. Accordingly, as a pulse value is inputted, the second motor 133 rotates by a corresponding angle, and simultaneously a liquid crystal capacity amount controlling member 134 inserted into the rotational shaft 136 linearly moves. As a result, the fixation angle between the liquid crystal discharge pump 140 and the fixing unit 149 is changed in response to the movement of the liquid crystal capacity amount controlling member 134, thereby changing an amount of the liquid crystal material discharged from the liquid crystal discharge pump 140.

As described above, the second motor 133 is a step motor and rotates once in response to, for example, an input of about 1000 pulses. That is, the second motor 133 rotates by about 0.36° in response to one pulse. Thus, the rotating angle of the second motor 133 can be minutely controlled using the pulse, and thus a minute adjustment of a dispensing amount of the liquid crystal discharge pump 140 is possible.

Figure 18:
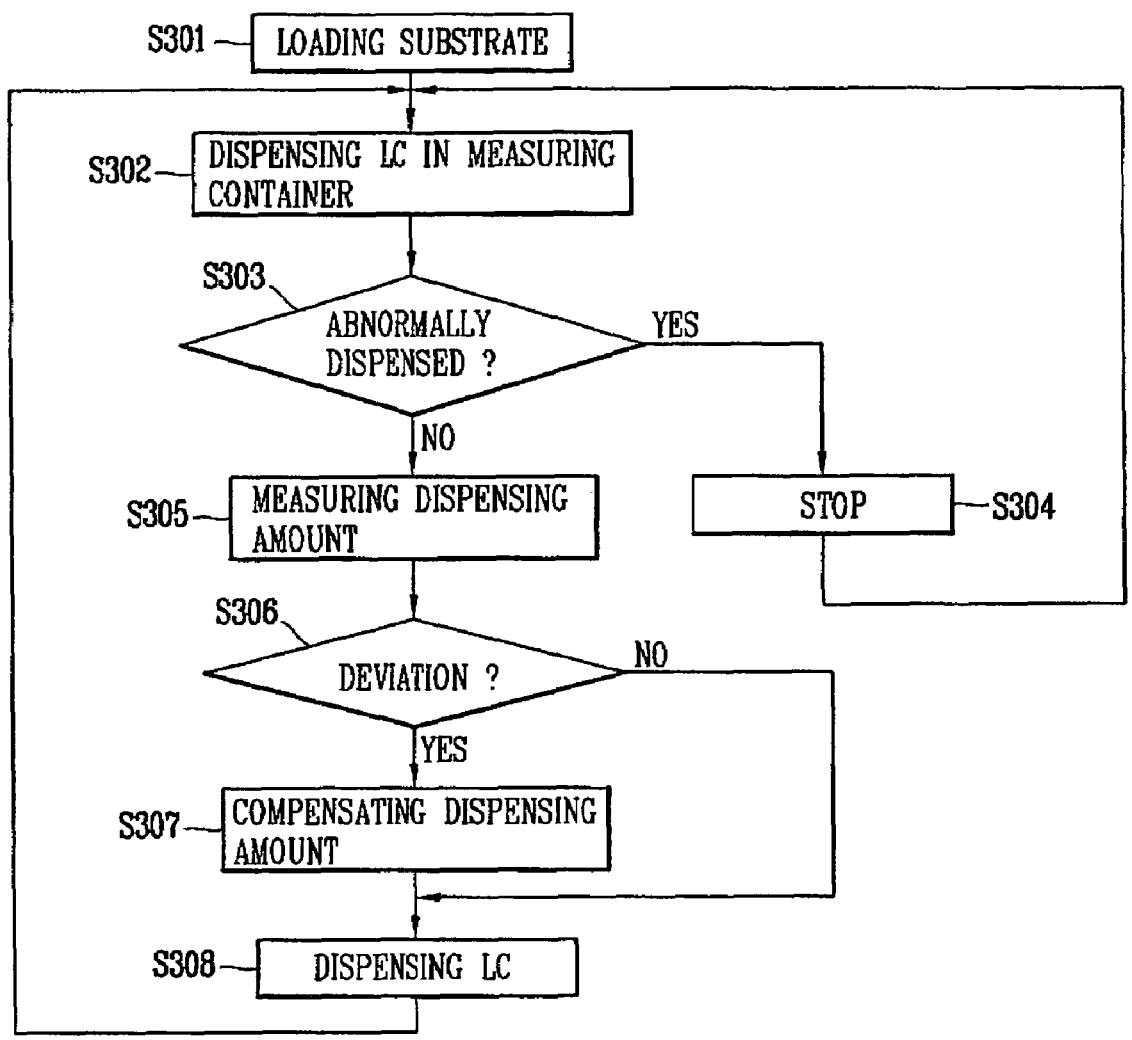
FIG. 18 is a flowchart illustrating a liquid crystal dispensing method using a liquid crystal dispensing system according to the present invention.

A method for dispensing a liquid crystal material onto a substrate using a liquid crystal dispensing system according to the present invention will now be explained in more detail. FIG. 18 is a flowchart illustrating a liquid crystal dispensing method using a liquid crystal dispensing system according to the present invention.

Referring to FIG. 18, first, the substrate 105 on which a plurality of unit panels are formed is loaded on the stage 114 of the liquid crystal dispensing system by a loading device such as a robot arm (S301). When the substrate 105 is loaded on the stage 114, the guide bar 115 moves in a y-direction to be located at a stand-by position at a periphery region. The large substrate 105 is loaded on the stage 114 when the guide bar 115 is located at the stand-by position. The loaded substrate 105 is fixed to the stage 114 through the suction holes 168 by a vacuum-suction method (or electrostatic suction or vacuum suction/electrostatic suction method).

Then, the guide bar 115 having a plurality of liquid crystal dispensing apparatuses 120 moves toward the measuring container 165 along a y-direction to dispense the liquid crystal material onto the measuring container 165 for a set number of times. Then, the liquid crystal dispensing system detects whether there is an abnormal dispensing caused by an external impact such as an earthquake or the like and simultaneously measures an actual dispensing amount of the liquid crystal material (S302 and S303).

An abnormal dispensing of the liquid crystal material is detected by a signal inputted from the weight measurement scale 164. A method for detecting an abnormal dispensing of the liquid crystal material is illustrated in FIG. 19.

Figure 19:
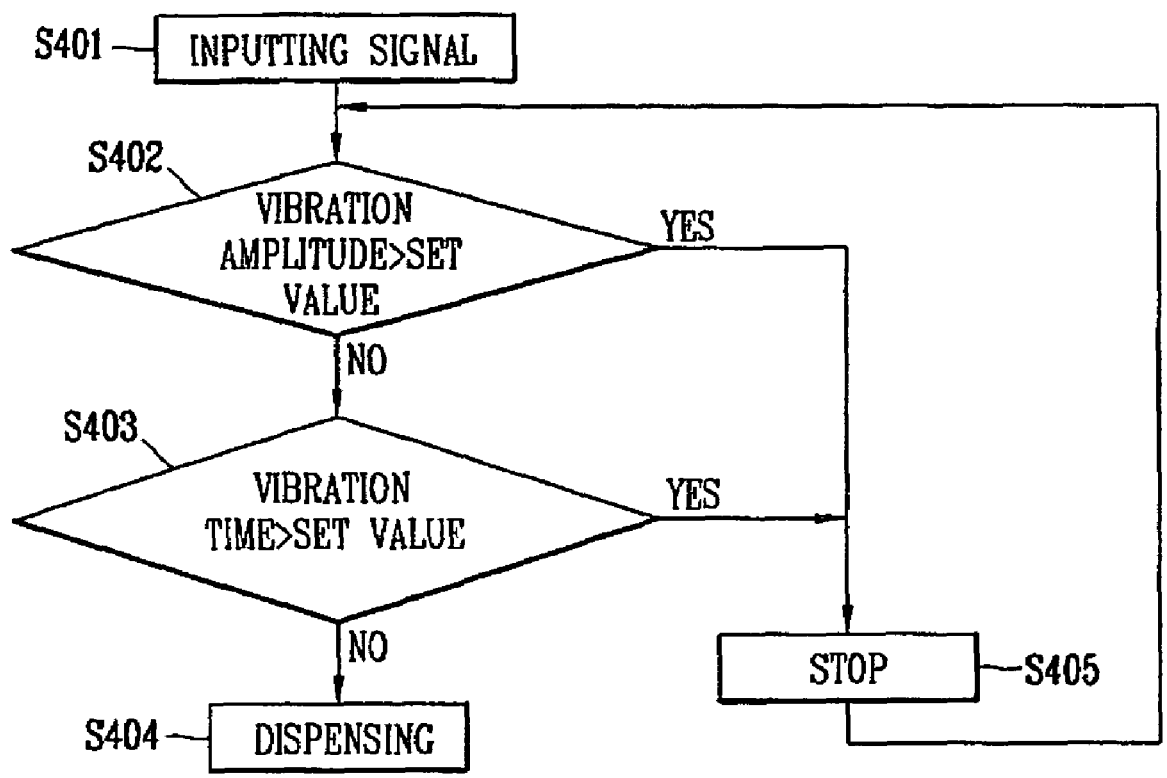
FIG. 19 is a flowchart of a method for detecting an abnormal dispensing in a liquid crystal dispensing system according to the present invention.

Referring to FIG. 19, when a liquid crystal material is dispensed onto the measuring container 165 and thus a signal is inputted from the weight measurement scale 164, the abnormal dispensing detecting unit 260 compares an amplitude of the inputted signal with that of a set value (S401 and S402). The set value is an amplitude of a limited oscillation value when dispensing the liquid crystal material onto the measuring container 165. If the amplitude of the inputted signal is greater than the set value, the inputted signal is determined to be caused by an external impact such as an earthquake, not by dispensing the liquid crystal material, and accordingly the operation of the liquid crystal dispensing apparatuses is paused (S405). If the amplitude of the inputted signal is smaller than the set value, the signal is determined to be caused by the dispensing of the liquid crystal material (i.e., it is determined that there is no abnormal dispensing).

Sometimes, the amplitude of the signal alone may not be sufficient to determine that an external impact such as an earthquake has been applied. A oscillation caused by the dispensing of the liquid crystal material onto the measuring container 165 has a very short duration, while a oscillation caused by an external impact such as an earthquake may have a long duration. Thus, when there is no abnormality in the amplitude of the inputted signal, the duration of the oscillation is compared to a set value (i.e., a limited socillation set value). If the duration of the oscillation of the inputted signal is longer than the set value, the oscillation is determined to be caused by an external impact such as an earthquake, not by the dispensing of the liquid crystal material 1, and thus the operation of the liquid crystal dispensing apparatuses (S405) is stopped. If the duration of the oscillation of the inputted signal is shorter than the set value, it is determined to be a signal by the dispensing of the liquid crystal material, and the liquid crystal dispensing system continues dispending the liquid crystal material onto the substrate.

Such processes are continuously and repeatedly performed. In other words, even after the dispensing process is paused due to the determination that the oscillation of the measuring container 165 is caused by an external impact, the dispensing process continues when it is determined that the external impact no longer affects the dispensing process. Accordingly, when a normal signal is inputted from the weight measurement scale 164, the dispensing process is restarted.

An abnormal dispensing of the liquid crystal material may be detected by a signal directly inputted from a control room, not by the signal inputted from the weight measurement scale 164. That is, an abnormal dispensing may be detected in response to an input signal from a measuring device provided in the control room. In this case, the abnormal dispensing is detected in response to the input signal, and simultaneously (as soon as determining an earthquake) the dispensing of the liquid crystal material is paused. Also, the dispensing of the liquid crystal material is restarted as soon as there is an input signal informing that the earthquake is stopped.

When it is determined that there is no abnormality in the dispensing of the liquid crystal material, the current dispensing amount of the liquid crystal material is measured based on the weight of the liquid crystal material inputted from the weight measurement scale 164 (S305), as illustrated in FIG. 18. This measured dispensing amount of the liquid crystal material is compared to the set dispensing amount of the liquid crystal material (S306). If the difference is within a permitted deviation, the current dispensing amount is maintained to continue the dispensing of the liquid crystal material (S308). If the difference exceeds the permitted deviation, the second motor 133 is driven to adjust the angle of the liquid crystal discharge pump 140, that is, a capacity amount of the liquid crystal discharge pump 140, and thus the amount of the liquid crystal material dispensed onto the substrate is controlled to dispense a compensated amount of the liquid crystal material (S307 and S308).

As described above, in the present invention, a signal inputted from the weight measurement scale for measuring the dispensing amount of the liquid crystal material is used to detect whether an external impact such as an earthquake is applied and thus pause the dispensing process. Therefore, it is effective to minimize or prevent a defect of an LCD panel caused by an inaccurate dispensing process due to an external impact, and also effective to minimize pausing of the processing line by detecting the termination of the external impact in a short time and restarting the dispensing process.

In above description, although the above dispenser is used to dispense the liquid crystal material, this dispenser is not limited this usage. That is, the dispenser of this invention may be used various dispensing device, such as a seal dispenser.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal dispensing system comprising:
    a liquid crystal dispensing apparatus for dispensing a liquid crystal material onto a substrate;
    a detecting unit for detecting a dispensing state of the liquid crystal material, the detecting unit including an oscillation measuring device of a weight measurement scale for measuring a dispensing amount of the liquid crystal material; and
    a controller for controlling the liquid crystal dispensing apparatus to pause dispensing of the liquid crystal material when the abnormal dispensing is detected,
    wherein the oscillation measuring device measures an oscillation signal and the controller compares the measured oscillation signal with the set oscillation value to detect the abnormal dispensing.

2. The system of claim 1, wherein the liquid crystal dispensing apparatus includes:
    a container containing the liquid crystal material therein;
    a liquid crystal discharge pump for intaking and discharging the liquid crystal material contained in the container; and
    a nozzle for dispensing the liquid crystal material discharged from the liquid crystal discharge pump onto the substrate.

3. The system of claim 2, wherein the liquid crystal discharge pump includes:
    a cylinder;
    a piston inserted into the cylinder and having a groove at a lower portion, for rotating and moving upwardly and downwardly and thus intaking and discharging the liquid crystal material; and
    a suction opening and a discharge opening for taking and discharging liquid crystal material according to the movement of the piston.

4. The system of claim 1, wherein the abnormal dispensing is caused by an external impact.

5. The system of claim 1, wherein the weight measurement scale is an electronic scale for outputting a signal in response to an applying of impact.

6. The system of claim 4, wherein the oscillation measuring device includes earthquake measuring device.

7. The system of claim 1, wherein the controller includes:
    an abnormal dispensing detecting unit for detecting an abnormal dispensing in response to the oscillation signal inputted from the detecting unit;
    a dispensing amount setting unit for setting an amount of the liquid crystal material to be dispensed onto the substrate;
    a dispensing amount compensating unit for compensating a difference between the dispensing amount of the liquid crystal material set by the dispensing amount setting unit and an actual dispensing amount of the liquid crystal material dispensed onto the substrate;
    a motor driving unit for driving a motor to operate the liquid crystal discharge pump; and
    a substrate driving unit for aligning a substrate to the dispensing position of the nozzle.

8. The system of claim 7, wherein the abnormal dispensing detecting unit includes:
    a signal analyzing unit for analyzing the oscillation signal inputted from the detecting unit; and an abnormal state detecting unit for comparing the oscillation signal inputted from the signal analyzing unit with the set oscillation value and thus detecting an abnormal dispensing.

9. The system of claim 8, wherein the dispensing of liquid crystal material is paused when an amplitude of the inputted oscillation signal is greater than a set oscillation value.

10. The system of claim 8, wherein the dispensing of liquid crystal material is paused when a oscillation duration of the inputted oscillation signal is greater than a set oscillation value.

11. The system of claim 7, wherein the dispensing amount compensating unit includes:
a dispensing amount calculating unit for calculating a current dispensing amount of the liquid crystal material based on the dispensing amount measured by the dispensing amount measuring unit;
a difference value calculating unit for calculating a difference between the dispensing amount of the liquid crystal material calculated by the dispensing amount calculating unit and a set dispensing amount of the liquid crystal material;
a dispensing amount limit value setting unit for setting a limit value of the difference between each dispensing amount; and
a comparing unit for comparing the difference between each dispensing amount and the limit value inputted from the difference value calculating unit and the dispensing amount limit value setting unit, respectively, to thus output a signal to the motor driving unit.

12. The system of claim 7, wherein the motor driving unit includes:
a pulse value storing unit for storing pulse value information with respect to the dispensing amount of the liquid crystal material; and
a pulse value converting unit for converting the dispensing amount set value and the dispensing amount compensated value inputted from the dispensing amount compensating unit into pulse values based on the pulse value information stored in the pulse value storing unit, and thus outputting the converted pulse value to the motor.

13. The system of claim 1, wherein the controller includes:
an abnormal dispensing detecting unit for detecting an abnormal dispensing by the oscillation signal inputted from the detecting unit;
a motor driving unit for driving a motor to operate the liquid crystal discharge pump, and stopping the driving of motor when an abnormal dispensing is detected by the abnormal dispensing detecting unit; and
a substrate driving unit for aligning the substrate to the dispensing position of the nozzle.

14. The system of claim 13, wherein the abnormal dispensing detecting unit includes:
a signal analyzing unit for analyzing the oscillation signal inputted from the detecting unit; and
an abnormal state detecting unit for comparing the oscillation signal inputted from the signal analyzing unit with a set oscillation value and thus detecting the abnormal dispensing.

15. The system of claim 14, wherein the dispensing of liquid crystal material is paused when an amplitude of the inputted oscillation signal is greater than a set oscillation value.

16. The system of claim 13, wherein the dispensing of liquid crystal material is paused when a oscillation duration of the inputted oscillation signal is greater than a set oscillation value.

17. A liquid crystal dispensing method comprising:
measuring an oscillation of a weight measurement scale to output an oscillation signal;
comparing the oscillation signal with a set oscillation value to detect the abnormal dispensing of the liquid crystal material;
arranging a liquid crystal dispensing apparatus of the liquid crystal dispensing system over a dispensing position; and
dispensing the liquid crystal material at the dispensing position.

18. The method of claim 17, further comprising pausing the dispensing of the liquid crystal material when the abnormal dispensing is detected.

19. The method of claim 17, wherein the comparing of the oscillation signal with the set oscillation value includes comparing an amplitude of the oscillation signal with a set oscillation amplitude.

20. The method of claim 19, wherein the dispensing of the liquid crystal material is paused when the amplitude of the oscillation signal is greater than the set oscillation amplitude.

21. The method of claim 17, wherein the comparing of the oscillation signal with the set oscillation value includes comparing a oscillation duration of the oscillation signal with a set oscillation duration.

22. The method of claim 21, wherein the dispensing of the liquid crystal material is paused when the oscillation duration of the oscillation signal is greater than the set oscillation duration.

23. The method of claim 18, further comprising restarting the dispensing of the liquid crystal material when the abnormal dispensing is removed.

24. The method of claim 17, wherein the dispensing of the liquid crystal material includes:
measuring the dispensing amount of the liquid crystal material;
compensating the dispensing amount of the liquid crystal material when a deviation is generated between the measured dispensing amount and a set dispensing amount; and
dispensing the liquid crystal material onto the substrate.

25. The method of claim 17, wherein the dispensing of the liquid crystal material further includes setting the dispensing amount of the liquid crystal material.

26. The method of claim 25, wherein the setting of the dispensing amount of the liquid crystal material includes calculating the dispensing amount based on an area of unit panel, a display mode of the unit panel, a alignment direction of an alignment layer, and information of the liquid crystal material.

27. The method of claim 25, wherein the setting of the dispensing amount of the liquid crystal material includes setting a dispensing amount by a user.

28. The method of claim 24, wherein the measuring of the dispensing amount of the liquid crystal material includes:
measuring a weight of the dispensed liquid crystal material using the weight measurement scale; and
converting the measured weight into a value of volume.

29. The method of claim 28, wherein the measuring of the weight of the liquid crystal material includes:
dispensing the liquid crystal material onto a measuring container a set number of times;
measuring a weight of the dispensed liquid crystal material; and
dividing the measured weight by the number of times being dispensed.

30. The method of claim 17, wherein the liquid crystal dispensing apparatus includes:
a container containing the liquid crystal material therein;
a liquid crystal discharge pump for intaking and discharging the liquid crystal material contained in a material container; and
a nozzle for dispensing the liquid crystal material discharged from the liquid crystal discharge pump onto the substrate.

31. The method of claim 30, wherein the liquid crystal discharge pump includes:
a cylinder;
a piston inserted into the cylinder and having a groove at a lower portion, for rotating and moving upwardly and downwardly and thus intaking and discharging the liquid crystal material; and
a suction opening and a discharge opening for intaking and discharging the liquid crystal material according to the movement of the piston.

32. A liquid crystal dispensing system comprising:
a liquid crystal dispensing apparatus for dispensing a liquid crystal material onto a substrate;
a detecting unit for detecting a dispensing state of the liquid crystal material, the detecting unit including an impact measuring device for detecting an occurrence of earthquake or typhoon; and
a controller for controlling the liquid crystal dispensing apparatus to pause dispensing of the liquid crystal material when the abnormal dispensing is detected,
wherein an oscillation measuring device measures an oscillation signal and the controller compares the measured oscillation signal with the set oscillation value to detect the abnormal dispensing.

33. A liquid crystal dispensing method comprising:
arranging a liquid crystal dispensing apparatus of the liquid crystal dispensing system over a dispensing position
dispensing the liquid crystal material at the dispensing position
detecting an abnormal dispensing state in an occurrence of earthquake or typhoon through an oscillation of a weight measurement scale to output an oscillation signal; and
pausing the dispensing of the liquid crystal material when the abnormal dispensing is detected.

* * * * *